(12) United States Patent
Yagiela et al.

(10) Patent No.: US 12,000,493 B2
(45) Date of Patent: Jun. 4, 2024

(54) CHECK VALVE

(71) Applicant: Swagelok Company, Solon, OH (US)

(72) Inventors: Anthony Robert Yagiela, Sagamore Hills, OH (US); Cal R. Brown, Lyndhurst, OH (US); Gregory S. Kalata, Avon Lake, OH (US); Erick R. Shelley, Lyndhurst, OH (US); Jeffrey M. Rubinski, Novelty, OH (US)

(73) Assignee: SWAGELOK COMPANY, Solon, OH (US)

( * ) Notice: Subject to any disclaimer, the term of this patent is extended or adjusted under 35 U.S.C. 154(b) by 0 days.

(21) Appl. No.: 17/988,851

(22) Filed: Nov. 17, 2022

(65) Prior Publication Data
US 2023/0151898 A1 May 18, 2023

Related U.S. Application Data

(60) Provisional application No. 63/280,346, filed on Nov. 17, 2021.

(51) Int. Cl.
*F16K 15/06* (2006.01)
*F16K 1/38* (2006.01)
(Continued)

(52) U.S. Cl.
CPC .............. *F16K 15/064* (2021.08); *F16K 1/38* (2013.01); *F16K 1/427* (2013.01);
(Continued)

(58) Field of Classification Search
CPC .................. F16K 15/026; F16K 15/063; Y10T 137/7866; Y10T 137/7867;
(Continued)

(56) References Cited

U.S. PATENT DOCUMENTS 2,744,727 A * 5/1956 Osburn .................. E21B 21/10
137/454.2
2,745,432 A * 5/1956 Williams .............. F16K 15/026
137/540

(Continued)

FOREIGN PATENT DOCUMENTS

CN 201715046 U 1/2011
CN 102032351 B 9/2015
(Continued)

OTHER PUBLICATIONS

Office action from Chinese Application No. 2020800376935 dated Oct. 30, 2023.
(Continued)

*Primary Examiner* — Robert K Arundale
(74) *Attorney, Agent, or Firm* — Calfee, Halter & Griswold LLP

(57) ABSTRACT

A check valve includes a valve element and a valve body having a body housing, an annular valve seat insert, a bushing, and a biasing member. The body housing includes an outer circumferential wall extending between an inlet port and an outlet port to define a valve cavity therebetween. The valve seat insert is seated in a body seat surface surrounding the inlet port. The bushing is disposed in the valve cavity and defines a central bore, with the bushing including an outboard end surface axially engageable with the valve seat insert. The biasing member is disposed between a bearing portion of the body housing and an inboard end of the bushing to allow for axial movement of the bushing with respect to the body seat surface. The valve element extends through the bushing central bore and is movable between a closed position and an open position.

36 Claims, 13 Drawing Sheets

(51) Int. Cl.
*F16K 1/42* (2006.01)
*F16K 15/02* (2006.01)
*F16K 27/02* (2006.01)

(52) U.S. Cl.
CPC ........ *F16K 27/0209* (2013.01); *F16K 15/026* (2013.01); *F16K 2200/3051* (2021.08); *F16K 2200/3053* (2021.08); *Y10T 137/7925* (2015.04); *Y10T 137/7929* (2015.04)

(58) Field of Classification Search
CPC ......... Y10T 137/7868; Y10T 137/7925; Y10T 137/7929; Y10T 137/7932
See application file for complete search history.

(56) References Cited

U.S. PATENT DOCUMENTS

| | | | |
|---|---|---|---|
| 2,916,046 A | 12/1959 | Turansky et al. | |
| 2,918,083 A | 12/1959 | Clark, Jr. et al. | |
| 2,940,472 A * | 6/1960 | Chilcoat | F16K 15/063 |
| | | | 251/364 |
| 3,134,394 A | 5/1964 | Ohta | |
| 3,356,103 A | 12/1967 | Biello et al. | |
| 3,366,138 A | 1/1968 | Graham | |
| 3,513,872 A | 5/1970 | Tupper | |
| 4,203,466 A | 5/1980 | Hager | |
| 5,322,260 A | 6/1994 | Forbes et al. | |
| 5,730,475 A | 3/1998 | Kargula | |
| 5,799,871 A | 9/1998 | Theurer | |
| 5,887,911 A | 3/1999 | Kargula | |
| 5,893,389 A | 4/1999 | Cunningham | |
| 5,918,628 A * | 7/1999 | Harding | F16K 15/026 |
| | | | 137/538 |
| 6,581,907 B1 | 6/2003 | Kuwabara et al. | |
| 6,779,778 B2 | 8/2004 | Kuwabara | |
| 6,820,645 B2 | 11/2004 | Behl et al. | |
| 6,869,060 B2 | 3/2005 | Barber et al. | |
| 7,000,953 B2 | 2/2006 | Berghaus | |
| 7,213,845 B2 | 5/2007 | Sato et al. | |
| 7,225,831 B2 | 6/2007 | Hope et al. | |
| 7,255,373 B2 | 8/2007 | Pridham | |
| 7,360,557 B2 | 4/2008 | Flynn | |
| 7,452,006 B2 | 11/2008 | Kohda | |
| 7,455,328 B2 | 11/2008 | Chelchowski et al. | |
| 7,475,930 B2 | 1/2009 | Tiberghien et al. | |
| 7,578,529 B2 | 8/2009 | Lutzke et al. | |
| 7,695,027 B2 | 4/2010 | Williams et al. | |
| 7,762,593 B2 | 7/2010 | LeBars et al. | |
| 7,900,973 B2 | 3/2011 | Herberg et al. | |
| 7,926,855 B2 | 4/2011 | Kitagawa | |
| 8,029,024 B2 | 10/2011 | Guest | |
| 8,136,547 B2 | 3/2012 | Francini et al. | |
| 8,226,128 B2 | 7/2012 | Lee | |
| 8,230,875 B2 | 7/2012 | Norman | |
| 8,276,614 B2 | 10/2012 | Park | |
| 8,453,670 B2 | 6/2013 | Francini et al. | |
| 8,628,119 B2 | 1/2014 | Hasunuma et al. | |
| 8,870,235 B2 | 10/2014 | Turk | |
| 8,875,734 B2 | 11/2014 | Weh et al. | |
| 8,876,170 B2 | 11/2014 | Williams et al. | |
| 8,882,156 B2 | 11/2014 | Guest | |
| 8,931,807 B2 | 1/2015 | Taylor | |
| 8,931,810 B2 | 1/2015 | Clason et al. | |
| 8,978,696 B2 | 3/2015 | Andersson | |
| 9,163,737 B2 | 10/2015 | Andersson | |
| 9,267,627 B2 | 2/2016 | Bennett et al. | |
| 9,395,006 B2 | 7/2016 | Ikeda et al. | |
| 9,404,611 B2 | 8/2016 | Ekstrom | |
| 9,476,528 B2 | 10/2016 | Tiberghien et al. | |
| 9,683,354 B2 | 6/2017 | Gass et al. | |
| 9,752,713 B2 | 9/2017 | Tiberghien et al. | |
| 9,903,518 B2 | 2/2018 | Clason et al. | |
| 9,909,703 B2 | 3/2018 | Van Scyoc | |
| 9,958,097 B2 | 5/2018 | Rubinski et al. | |
| 9,958,100 B2 | 6/2018 | Kuroyanagi et al. | |
| 10,001,221 B2 | 6/2018 | Schmit et al. | |
| 10,072,766 B2 | 9/2018 | Jurczyk | |
| 10,173,046 B2 | 1/2019 | Ciccone et al. | |
| 10,184,569 B2 | 1/2019 | Thomas et al. | |
| 10,428,962 B2 | 10/2019 | Suzuki et al. | |
| 10,458,584 B2 | 10/2019 | Tiberghien et al. | |
| 10,527,214 B2 | 1/2020 | Tiberghien et al. | |
| 10,547,164 B2 | 1/2020 | Dhotre et al. | |
| 10,550,973 B2 | 2/2020 | Caston et al. | |
| 2007/0232147 A1 | 10/2007 | Herberg et al. | |
| 2012/0130236 A1 | 5/2012 | Nystrom | |
| 2013/0099486 A1 | 4/2013 | Weh et al. | |
| 2016/0238154 A1 | 8/2016 | Alman | |
| 2018/0119831 A1 | 5/2018 | Suzuki et al. | |
| 2021/0062926 A1 | 3/2021 | Haines et al. | |
| 2021/0108736 A1 | 4/2021 | Seo et al. | |
| 2022/0260164 A1 | 8/2022 | Clason et al. | |

FOREIGN PATENT DOCUMENTS

| | | |
|---|---|---|
| CN | 106468367 | 3/2017 |
| CN | 10289159 A | 10/2017 |
| DE | 10110525 A1 | 9/2002 |
| DE | 202005020318 U1 | 3/2006 |
| DE | 202011004557 U1 | 8/2011 |
| EP | 187769 B1 | 5/1991 |
| EP | 2299155 A1 | 3/2011 |
| GB | 2021238 | 11/1979 |
| IN | 201402528 | 8/2018 |
| JP | 2001193883 A | 7/2001 |
| JP | 2005291409 A | 10/2005 |
| JP | 5449941 B2 | 3/2014 |
| JP | 2014111979 A | 6/2014 |
| JP | 5698449 B2 | 4/2015 |
| JP | 2016109170 A | 6/2016 |
| WO | 2003089820 A1 | 10/2003 |
| WO | 2010/080027 | 7/2010 |
| WO | 2020/236853 | 11/2020 |

OTHER PUBLICATIONS

Kepner Products Company, one page brochure, Flexible Seal Seat, established 1948.
SSP Products, Ball Poppet Check Valves 4000 Series, 4 pg web printout, copyright 2022.
International Search Report and Written Opinion from PCT/US2020/033676 dated Oct. 12, 2020.
International Search Report and Written Opinion from PCT/US2022/050189 dated Apr. 28, 2023.
Office action from U.S. Appl. No. 17/612,267 dated Jan. 25, 2024.
Office action from Japanese Application No. 2021-569141 dated Jan. 4, 2024.

* cited by examiner

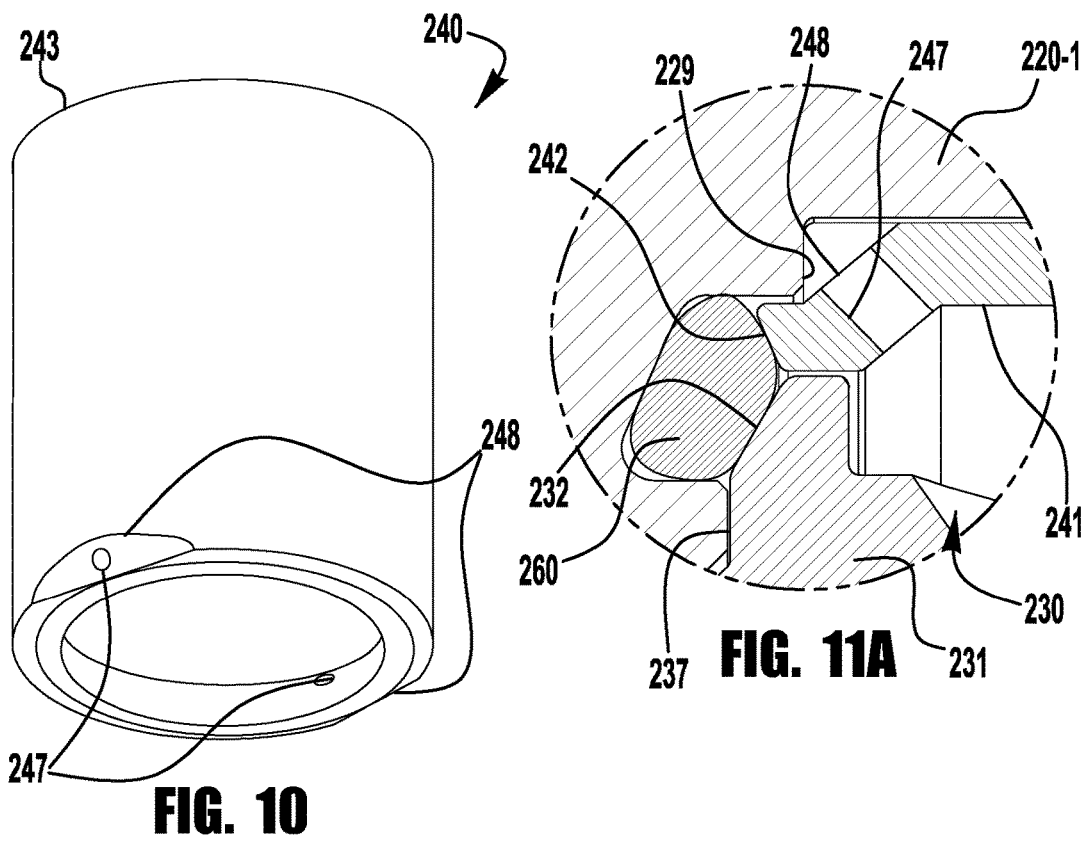
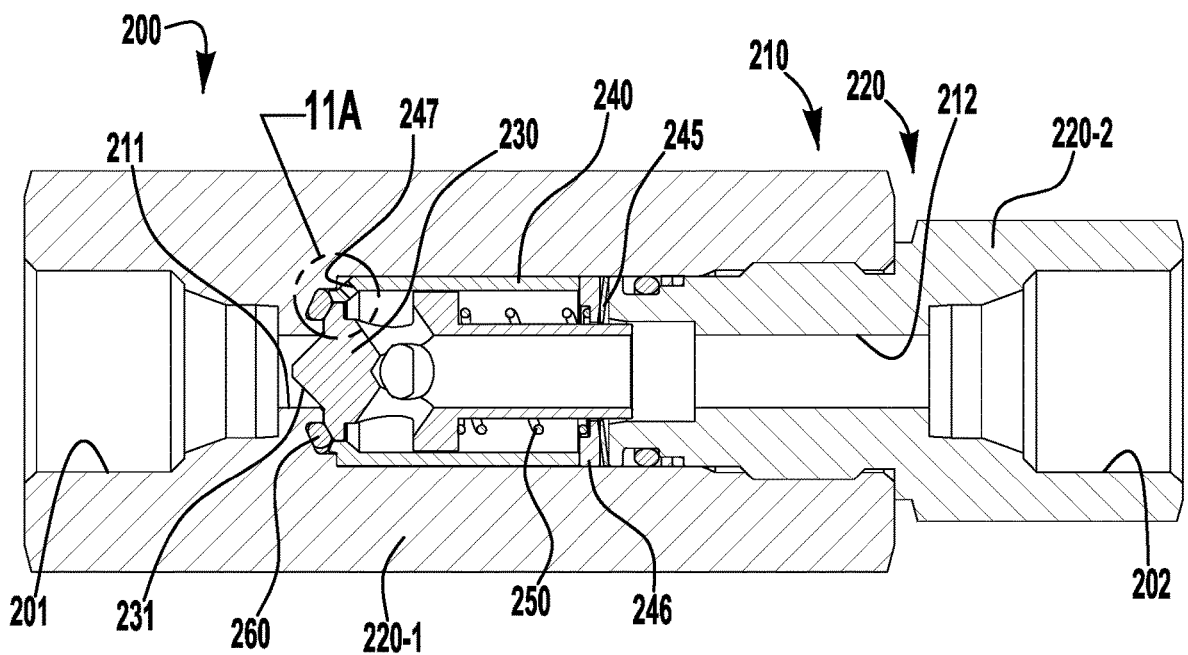
FIG. 10
FIG. 11A
FIG. 11

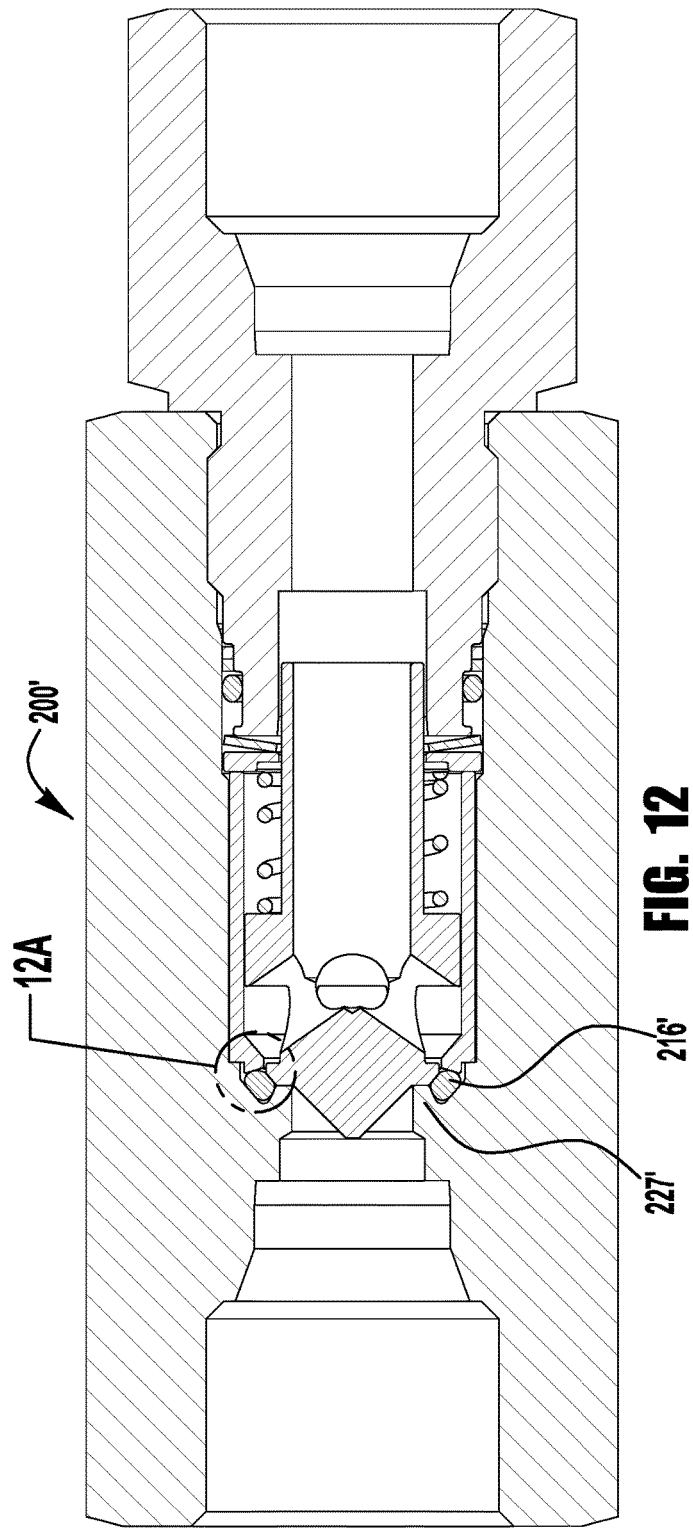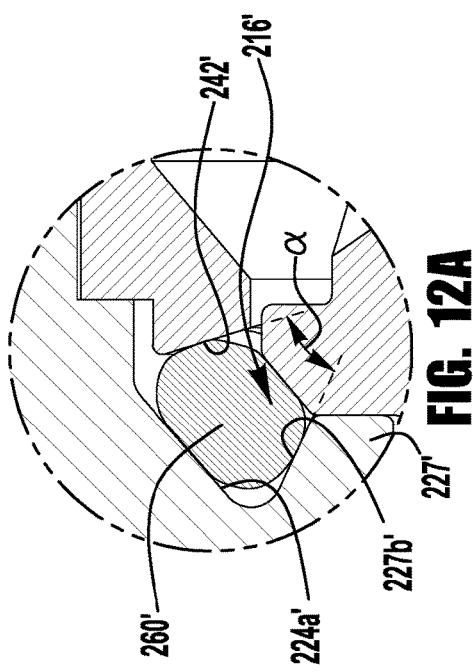

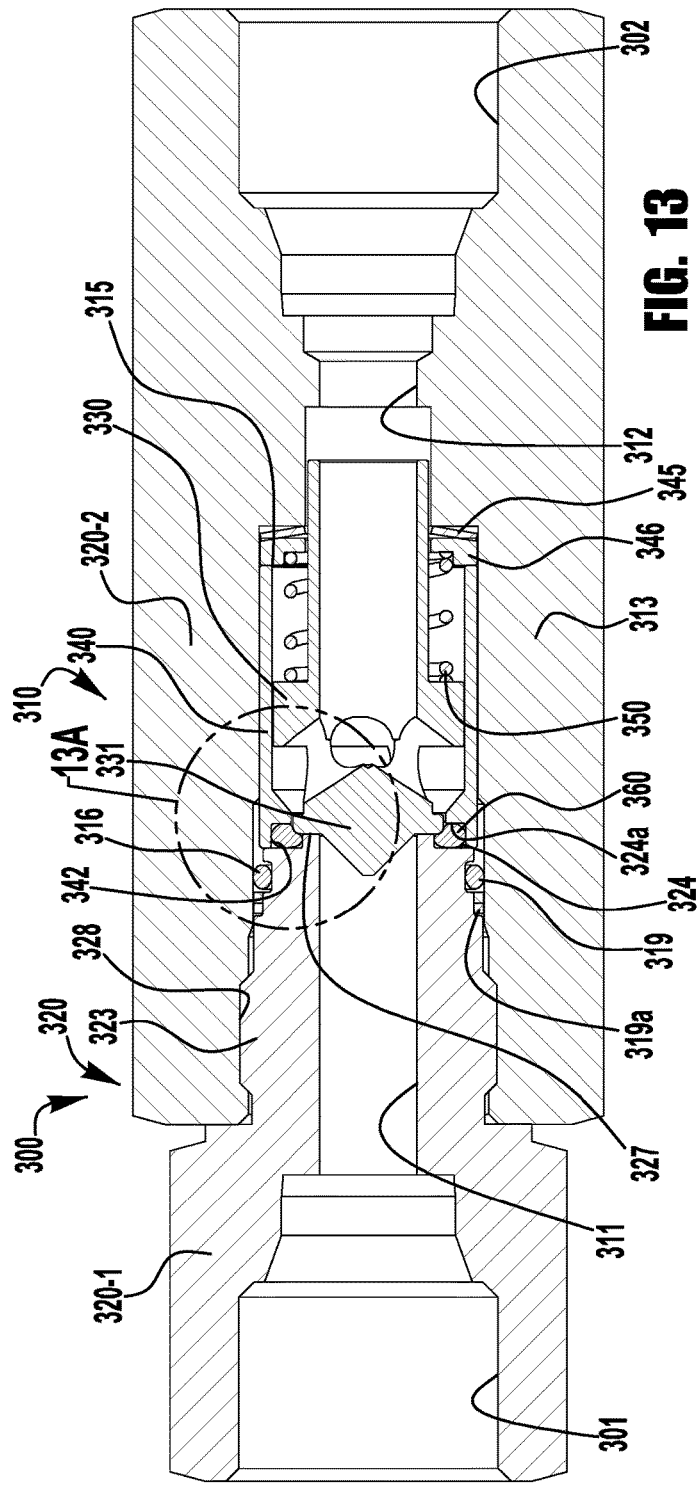
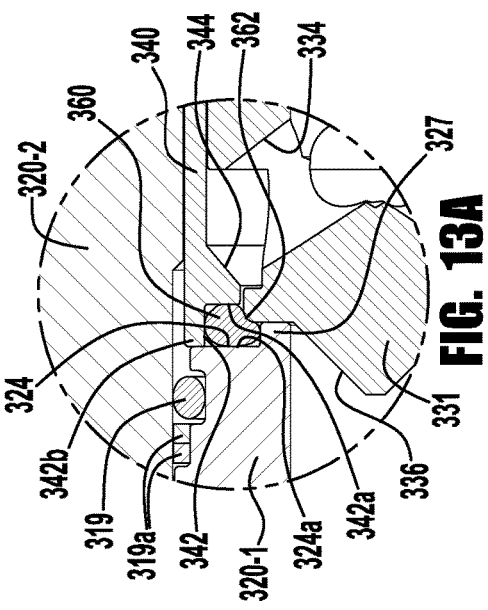
FIG. 13
FIG. 13A

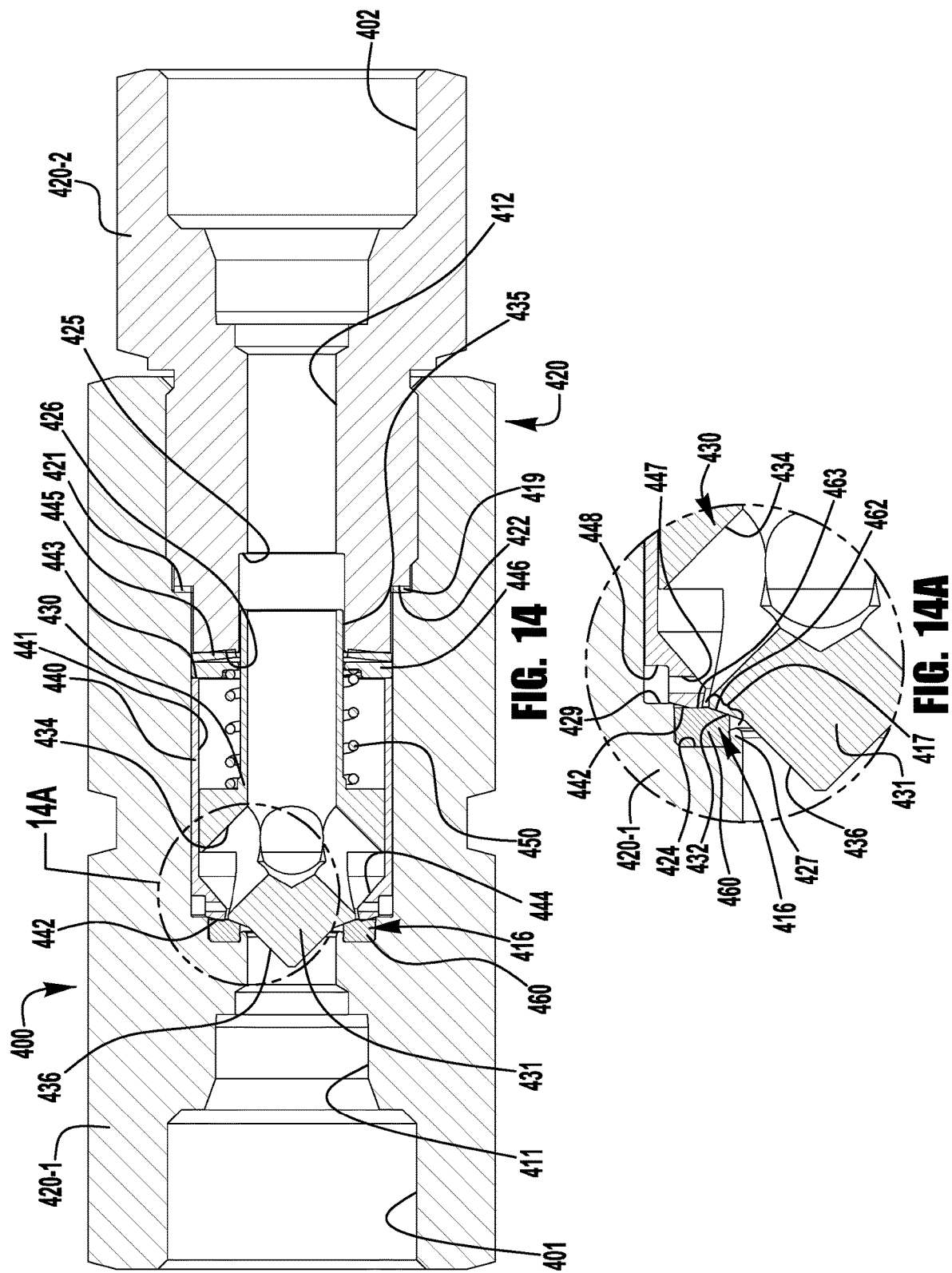

＃ CHECK VALVE

CROSS-REFERENCE TO RELATED APPLICATION

This application claims priority to and all benefit of U.S. Provisional Patent Application Ser. No. 63/280,346, filed on Nov. 17, 2021, for CHECK VALVE, the entire, disclosure of which is incorporated herein by reference.

BACKGROUND

Check valves are used to allow flow in one direction but then close off flow in the reverse direction to prevent undesirable backflow in piping systems. The valve element (e.g., poppet) of a check valve typically has two main forces acting upon it, the closing force that can be generated by a spring, magnet, or gravity and the opening force generated from the upstream fluid. Valve chatter can occur when the forces are balanced (i.e., offsetting) and there are instabilities in the flow of system media. It is often advantageous to have the force acting to open the poppet measurably greater than the force to close the valve; however, this is typically achieved with a tradeoff in the full stroke of the valve element and a reduction in overall flow capability.

SUMMARY OF THE DISCLOSURE

In accordance with an embodiment of one or more of the inventions presented in this disclosure, a check valve includes a valve element and a valve body having a body housing, an annular valve seat insert, a bushing, and a biasing member. The body housing includes an outer circumferential wall extending between an inlet port and an outlet port to define a valve cavity therebetween. The valve seat insert is seated in a body seat surface surrounding the inlet port. The bushing is disposed in the valve cavity and defines a central bore, with the bushing including an outboard end surface axially engageable with the valve seat insert. The biasing member is disposed between a bearing portion of the body housing and an inboard end of the bushing to allow for axial movement of the bushing with respect to the body seat surface. The valve element extends through the bushing central bore and is movable between a closed position in which the valve element seals against the valve seat insert to prevent flow between the inlet port and the outlet port, and an open position in which fluid flow is permitted from the inlet port to the outlet port.

In accordance with another embodiment of one or more of the inventions presented in this disclosure, a check valve includes a valve element and a valve body having a body housing, an annular valve seat insert, and a bushing. The body housing includes an outer circumferential wall extending between an inlet port and an outlet port to define a valve cavity therebetween. The valve seat insert is seated in a body seat surface surrounding the inlet port. The bushing is disposed in the valve cavity and defines a central bore, with the bushing including an outboard end surface in axial engagement with the valve seat insert. The valve element extends through the bushing central bore and is movable between a closed position in which a head portion of the valve element seals against the valve seat insert to prevent flow between the inlet port and the outlet port and an open position in which fluid flow is permitted from the inlet port, into the bushing central bore, and through an internal flow passage in the valve element to the outlet port. The bushing further comprises a tapered flow guide surface opposite the outboard end surface and angled to substantially match an angled conical surface of the valve element head portion, to guide flow toward the valve element flow passage when the valve element is in the open position.

In accordance with another embodiment of one or more of the inventions presented in this disclosure, a check valve includes a valve element and a valve body having a body housing, an annular valve seat insert, and a bushing. The body housing includes an outer circumferential wall extending between an inlet port and an outlet port to define a valve cavity therebetween. The valve seat insert is seated in a body seat surface surrounding the inlet port. The bushing is disposed in the valve cavity and defines a central bore, with the bushing including an outboard end surface in axial engagement with the valve seat insert. The valve element extends through the bushing central bore and is movable between a closed position in which the valve element seals against the valve seat insert to prevent flow between the inlet port and the outlet port, and an open position in which fluid flow is permitted from the inlet port to the outlet port. The body seat surface includes a recessed surface sized to retain the valve seat insert and an annular inner wall portion extending axially inboard from the recessed surface, the annular inner wall portion being sized to limit compression of the valve seat insert by the valve element to a predetermined fraction of an uncompressed thickness of the valve seat insert.

In accordance with another embodiment of one or more of the inventions presented in this disclosure, a check valve includes a valve element and a valve body having a body housing, an annular valve seat insert, and a bushing. The body housing includes an outer circumferential wall extending between an inlet port and an outlet port to define a valve cavity therebetween. The valve seat insert is seated in a body seat surface surrounding the inlet port. The bushing is disposed in the valve cavity and defines a central bore, with the bushing including an outboard end surface in axial engagement with the valve seat insert. The valve element extends through the bushing central bore and is movable between a closed position in which the a head portion of the valve element seals against the valve seat insert to prevent flow between the inlet port and the outlet port, and an open position in which fluid flow is permitted from the inlet port to the outlet port. The body seat surface includes a secondary seal surface positioned to sealingly engage an outer peripheral sealing face of the valve element head portion, radially inward of the valve seat insert, when the valve element is exposed to a backpressure exceeding a threshold backpressure.

In accordance with another embodiment of one or more of the inventions presented in this disclosure, a check valve includes a valve element and a valve body having a body housing, an annular valve seat insert, and a bushing. The body housing includes a first body housing member including an inlet port, a body seat surface surrounding the inlet port, and an outer circumferential wall extending to a female threaded end portion, and a second body housing member including an outlet port and a male threaded end screw assembled with the female threaded end portion. The valve seat insert is seated in a body seat surface surrounding the inlet port. The bushing is disposed in the valve cavity and defines a central bore, with the bushing including an outboard end surface in axial engagement with the valve seat insert and an inboard end engaged by a bearing portion of the male threaded end screw to transmit an axial compressive force from the second body housing member to the valve seat insert. The valve element extends through the bushing central bore and is movable between a closed position in which the valve element seals against the valve seat insert to prevent flow between the inlet port and the outlet port, and an open position in which fluid flow is permitted from the inlet port to the outlet port.

In accordance with another embodiment of one or more of the inventions presented in this disclosure, a check valve includes a valve element and a valve body having a body housing, an annular valve seat insert, and a bushing. The body housing includes an outer circumferential wall extending between an inlet port and an outlet port to define a valve cavity therebetween. The valve seat insert is seated in a body seat surface surrounding the inlet port. The bushing is disposed in the valve cavity and defines a central bore, with the bushing including an outboard end surface in axial engagement with the valve seat insert. The valve element extends through the bushing central bore and movable between a closed position in which the valve element seals against the valve seat insert to prevent flow between the inlet port and the outlet port, and an open position in which fluid flow is permitted from the inlet port, into the bushing central bore, and through an internal flow passage in the valve element to the outlet port. The body seat surface and the bushing outboard end surface together define an annular seal cavity sized to retain the valve seat insert. The bushing further comprises at least one outer peripheral recess extending to the outboard end surface to intersect the annular seal cavity, with the at least one outer peripheral recess including a vent passage intersecting the bushing central bore.

BRIEF DESCRIPTION OF THE DRAWINGS

Further advantages and benefits will become apparent to those skilled in the art after considering the following description and appended claims in conjunction with the accompanying drawings, in which:

FIG. 10 is a perspective view of the bushing of the check valve of FIG. 8;

FIG. 11 is another cross-sectional side view of the check valve of FIG. 8, showing a bushing vent passage;

FIG. 11A is an enlarged partial cross-sectional view of the poppet and body sealing portions of the check valve of FIG. 8, showing the bushing vent passage;

FIG. 12 is a cross-sectional view of a check valve in accordance with another exemplary embodiment of the present disclosure;

FIG. 12A is an enlarged partial cross-sectional view of the poppet and body sealing portions of the check valve of FIG. 12, shown with the poppet in the closed position;

FIG. 13 is a cross-sectional view of a check valve in accordance with another exemplary embodiment of the present disclosure;

FIG. 13A is an enlarged partial cross-sectional view of the poppet and body sealing portions of the check valve of FIG. 13;

FIG. 14 is a cross-sectional view of a check valve in accordance with another exemplary embodiment of the present disclosure; and FIG. 14A is an enlarged partial cross-sectional view of the poppet and body sealing portions of the check valve of FIG. 15.

DESCRIPTION OF THE EXEMPLARY EMBODIMENTS

Figure 1:
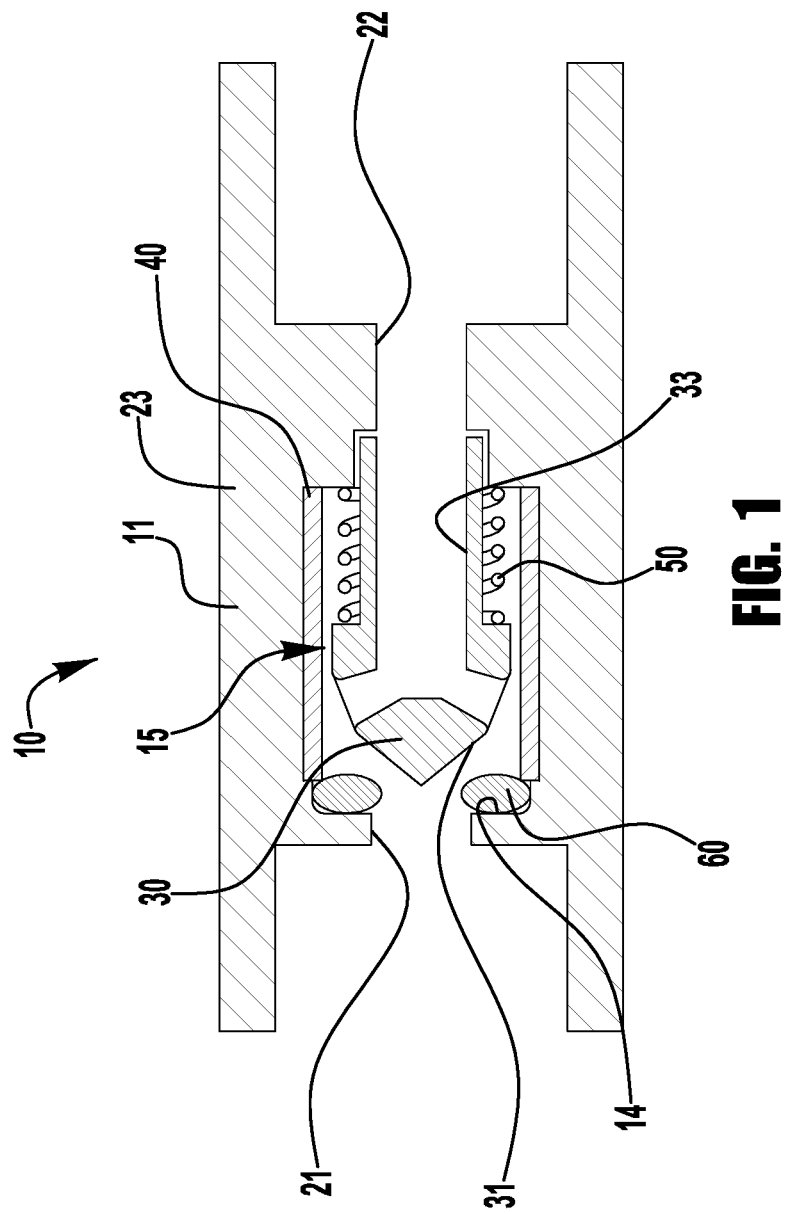
FIG. 1 is a cross-sectional schematic view of a check valve in accordance with an exemplary embodiment of the present disclosure.
Figure 2:
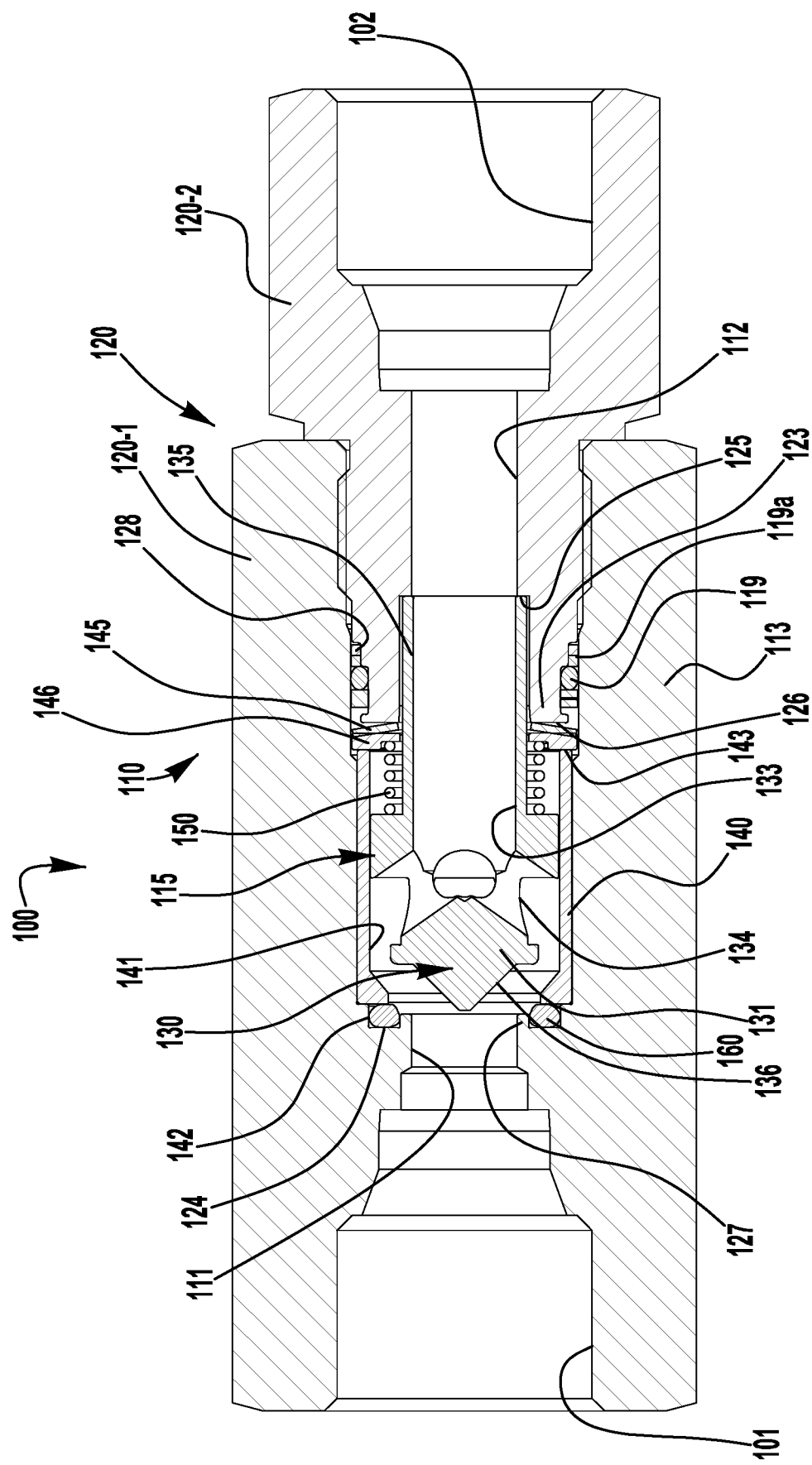
FIG. 2 is a cross-sectional view of a check valve in accordance with another exemplary embodiment of the present disclosure, shown with the poppet in the open position.
Figure 3:
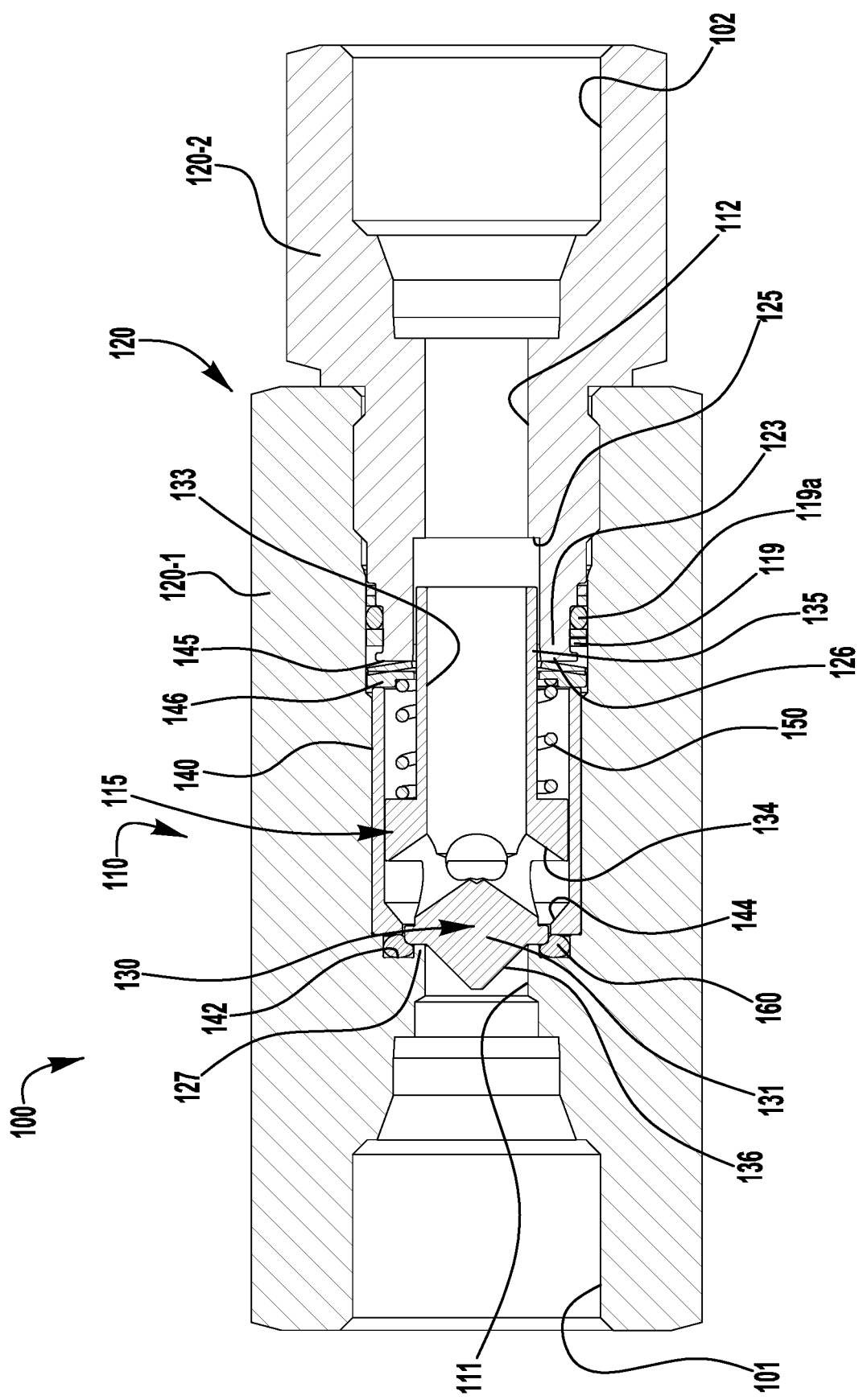
FIG. 3 is a cross-sectional view of the check valve of FIG. 2, shown with the poppet in the closed position.
Figure 4:
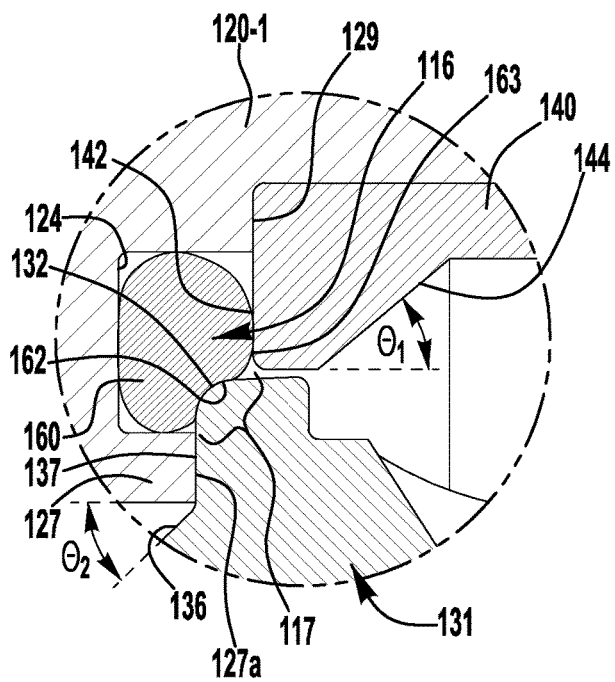
FIG. 4 is an enlarged partial cross-sectional view of the poppet sealing portion of the check valve of FIG. 2, shown with the poppet in a closed, secondary sealing position.
Figure 5:
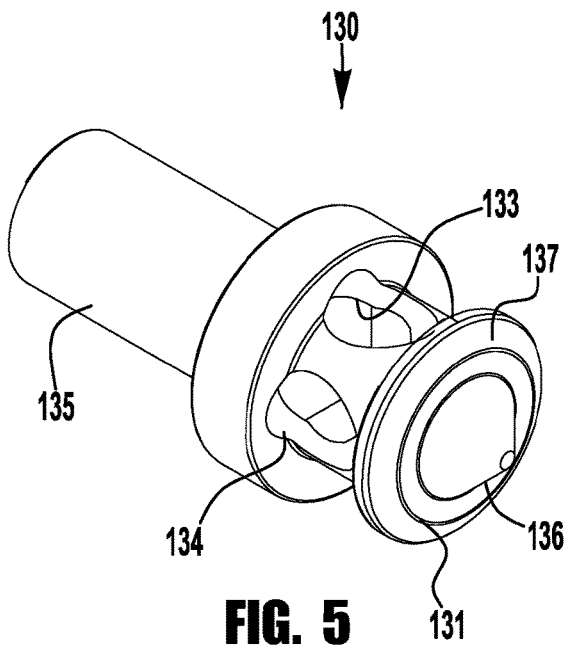
FIG. 5 is a perspective view of the poppet of the check valve of FIG. 2.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims, as currently written or as amended or added in the future. Descriptions of exemplary methods or processes are not limited to inclusion of all steps as being required in all cases, nor is the order that the steps are presented to be construed as required or necessary unless expressly so stated.

In an exemplary embodiment of the present disclosure, as schematically shown in FIG. 1, a check valve 10 includes a valve body 11 defining inlet and outlet ports 21, 22, an outer circumferential wall 23 and a valve seat 60 disposed in an annular seat surface 14 surrounding the inlet port 21. A valve element or poppet 30 is retained in a cavity 15 in the valve body 11 and movable in an internal guide passage (e.g., defined by an internal bushing 40, as described below) between a first, closed position in which a sealing forward end 31 of the valve element seals against the valve seat 60, for example, to block backflow to the inlet port 21 or low pressure flow from the inlet port, and a second, open position in which fluid flow is permitted through one or more flow passages 33 in the poppet 30 between the inlet port 21 and the outlet port 22. A biasing member 50 installed in the valve cavity 15 may apply a biasing force to the valve element 30 to bias the valve element towards the closed position.

The bushing 40 may include an outboard end surface 42 that extends opposite the seat surface 14 to further define an annular seat cavity 16 within the valve body 10, for example, to further enclose and retain the valve seat 60 within the seat cavity.

According to an aspect of the present disclosure, the check valve 10 may include a valve seat formed from an annular valve seat insert 60 (e.g., elastomeric O-ring or gasket, or plastic gland) secured with a seat surface 14 of the valve body 11 by a sleeve or bushing 40 installed in the valve body 11. In some such embodiments, the bushing 40 may be sized and positioned for controlled compressive engagement of the valve seat insert 60, for example, to effect a seal with the valve element 30 at an inner diameter of the valve seat insert 60, and a seal between the body seat surface 14 and the valve seat insert, while preventing over-compression of the valve seat insert. In other embodiments, the bushing may provide for seat insert containment without compressing or even contacting the seat insert at least under some conditions (e.g., in the valve's closed position).

As shown, the bushing 40 may additionally provide a guide passage for the valve element 30, for example, to direct fluid flow past the sealing forward end 31 of the valve element into the central flow passage 33 within the valve element.

Other exemplary embodiments of a check valve having a poppet carrier that applies a compressive or retaining force to a seat seal element are described in co-pending PCT Application Publication No. WO2020/236853, the entire disclosure of which is incorporated herein by reference.

A variety of configurations may be utilized to provide a check valve with a compressed, retained valve seat insert and a valve element guide passage for a poppet having an internal flow passage.

FIGS. 2-7 illustrate an exemplary embodiment of a check valve 100 including a valve body 110, a poppet 130, a biasing spring 150, and a valve seat insert 160. The valve body 110 includes a first or inlet port 111, a second or outlet port 112, and an outer circumferential wall 113 extending between the inlet and outlet ports to define an interior valve cavity 115 in which the poppet 130 and biasing spring 150 are retained. The biasing spring 150 surrounds a tail portion 135 of the poppet 130, and is compressed between a head portion 131 of the poppet and a bearing portion 126 of the body housing 120. The valve seat insert 160 is carried by a body seat surface 124 (e.g., a recessed surface or counterbore) surrounding the inlet port 111. The inlet and outlet ports 111, 112 may be provided with end connections 101, 102 (e.g., tube fitting connections) to assemble the check valve 100 in a fluid system.

The exemplary valve body 110 includes a body housing 120 including first and second body housing members 120-1, 120-2 assembled (e.g., threaded assembly) to define the interior valve cavity 115, with the inlet port 111 disposed on the first body housing member 120-1 and the outlet port 112 disposed on the second body housing member 120-2. The body seat surface 124 is disposed in (e.g., integrally formed in) the first body housing member 120-1. While the body housing members may be provided in a variety of structural arrangements, in the illustrated embodiment, the first body housing member 120-1 includes a substantially tubular body or enclosure structure defining the outer circumferential wall 113 and the interior valve cavity 115, and the second body housing member 120-2 includes an end screw structure having a male threaded inboard end 123 that is threadably assembled with a female threaded inboard end 128 of the first body housing member.

A body seal gasket 119 (e.g., with one or more backup rings 119a, as shown) may be provided in an annular groove in the second body housing member inboard end 123, for example, to provide a body seal between the valve cavity 115 and the threaded engagement of the body housing members 120-1, 120-2, thereby eliminating wetted threads. In other embodiments, as illustrated, for example, in the embodiment of FIG. 14, the check valve 400 may include a body seal gasket 419 that is axially compressed between a counterbore surface 421 of the inlet enclosure housing member 420-1 and a shoulder surface 422 of the outlet end screw housing member 420-2, which can also isolate the mating threads from the wetted portions of the valve. In some embodiments, the body seal gasket 419 may be metal (e.g., stainless steel, nickel alloy, brass, bronze, aluminum), for example, to provide a leak tight seal across a greater range of temperatures (e.g., about −60° C. to about 300° C.). The body gasket seal may be coated or lubricated to enhance the seal.

A variety of valve seats and valve seat installation arrangements may be utilized, including, for example, plastic or elastomeric valve seats. In an exemplary embodiment, the valve seat may be provided as an annular elastomeric seal (e.g., O-ring or other such gasket), for example, for use in non-cryogenic (e.g., temperatures at or above −40° C.)

systems requiring enhanced sealing capability. Exemplary elastomeric materials include, but are not limited to, fluoroelastomers (e.g., FKM), ethylene propylene diene monomer (EPDM), hydrogenated nitrile rubber (HNBR), and nitrile rubber. In the illustrated embodiment of FIGS. 2-7, the valve seat insert 160 includes a gasket seal, and the body seat surface 124 is provided as a counterbore formed (e.g., machined) in the first body housing member 120-1 surrounding the inlet port 111, in which the gasket seal 160 is seated. The gasket seal 160 is positioned to radially align with a head portion 131 of the poppet 130, for sealing engagement with the poppet head portion when the poppet is in the closed position. In the exemplary embodiment, an outer peripheral sealing edge 132 of the poppet head portion 131 engages an inner periphery 162 of the gasket seal 160. The outer peripheral sealing edge 132 may be provided with a radiused surface sized to optimize contact pressure and stress within the gasket seal 160 while compressed under higher back pressure. In an exemplary embodiment, the outer peripheral sealing edge 132 is provided with a contact surface having a radius between about 10% and about 30% of the gasket seal cross-sectional thickness. In other embodiments, the poppet may be provided with a frustoconical tapered sealing surface, similar to the embodiments of FIGS. 8-12C, described in greater detail below.

The poppet 130 includes a central bore 133 and one or more intersecting side channels 134 defining a poppet flow path extending from the head portion 131, inboard of the sealing edge, to an inboard tail portion 135 of the poppet. The poppet side channels 134 may extend at an angle (e.g., about 55° with respect to the valve central axis) selected to optimize flow from the inlet port 111 to the poppet central bore 133. When the poppet 130 is in an open position (e.g., with the inlet fluid pressure sufficient to overcome the biasing force of the spring 150), fluid from the inlet port 111 passes between the gasket seal 160 and the poppet head portion 131, and through the side channel(s) 134 and central bore 133 to the outlet port 112. The poppet head portion 131 may be provided with a conical surface 136 angled (e.g., about 30° to 60°, or about 40° to 45°, or about 45°, with respect to the valve central axis) to direct flow past the gasket seal 160 and toward the ends of the poppet side channels 134. As shown, the tail portion 135 of the poppet 130 is received in a counterbore 125 of the outlet port 112, for example, to substantially isolate the biasing spring 150 (disposed radially between the poppet tail portion and the bushing 140) from the system fluid. The outlet port counterbore 125 may be located to limit the open position of the poppet 130, by abutment with the poppet tail portion 135, for example, to limit compression of the biasing spring 150 to a desired functional range.

In some embodiments, the minimum flow areas of the inlet and outlet ports 111, 112 may be equal to or less than a flow area through the side channels 134 and central bore 133 of the poppet 130. In other embodiments, the flow area through the side channels 134 and central bore 133 of the poppet 130 may be configured to be less than the flow areas of the inlet and outlet ports 111, 112, for example, to bias the poppet 130 in the open position with minimal oscillation as the differential pressure across the check valve equalizes.

To effect a consistent seal between the poppet head portion 131 and the gasket seal 160 and between the gasket seal and the body seat surface 124 in the closed position, an axial compressive force may be applied to the gasket seal. In the illustrated embodiment, the valve body 110 includes a tubular bushing 140 installed in the valve cavity 115, around the poppet 130 and biasing spring 150 to apply a compressive force against the gasket seal 160. The bushing 140 includes a central bore 141 in which the poppet 130 is closely received and guided between closed and open positions. An inboard end 143 of the bushing 140 is indirectly engaged by the valve body housing 120 (e.g., by an inboard end face or bearing portion 126 of the second body housing member 120-2), forcing an outboard end surface 142 of the bushing 140 into compressing and sealing engagement with a medial peripheral portion 163 of the valve seat insert 160. In the illustrated embodiment, the outboard end surface 142 of the bushing 140 engages a shoulder portion 129 of the first body housing member 120-1 to limit compression of the gasket seal 160 (e.g., to prevent damage to the gasket seal). While any suitable materials may be used, in an exemplary embodiment, the bushing may be provided in a material (e.g., one of stainless steel, nickel alloy, brass, bronze, aluminum, and PEEK) dissimilar to the body housing material (e.g., a different one of stainless steel, nickel alloy, brass, bronze, aluminum, and PEEK), for example, to minimize wear or galling of the contacting surfaces, or to provide specific desired material properties for one or both of the bushing and the body housing. In other embodiments, the same material may be used for both the bushing and the body housing.

The valve seat gasket seal 160 may be radially retained with the body seat surface 124 by an annular inner wall portion 127 extending axially inboard from the recessed body seat surface, toward the bushing 140. When pressurized fluid is applied to the inlet port 111, the inner wall portion 127 shields the flow away from direct contact with the gasket seal inner periphery 162, for example, to protect the relatively soft gasket seal 160 from abrasive high velocity flow. The recessed surface 124, inner wall portion 127 and bushing end surface 142 together define an annular seal cavity 116 retaining the valve seat gasket seal 160 (e.g., in an inner peripheral portion of the seal cavity). The seal cavity 116 includes an inner peripheral gap 117 defined by the inner wall portion 127 and bushing end surface 142, which exposes the inner peripheral sealing portion 162 of the valve seat gasket seal 160, radially aligned with the outer peripheral sealing edge 132 of the poppet head portion 131 to provide a fluid tight seal when the poppet 130 is in the closed position.

In some applications, the body seat surface may include a secondary sealing surface that is engaged by the poppet head, for example, when the poppet is subjected to a substantial backpressure (e.g., greater than 25 psi, greater than 50 psi, or greater than 100 psi), for example, to limit or prevent damage to the gasket seal. In the illustrated embodiment, the inner wall portion 127 provides a secondary metal-to-metal sealing surface 127a engageable with an outer peripheral sealing face 137 of the poppet head portion 131, radially inward of the gasket seal 160, for example, when the poppet 130 is exposed to a backpressure exceeding a threshold backpressure, causing the poppet to compress the gasket seal inner periphery 162. In such an arrangement, the height h of the inner wall portion 127 may be selected to prevent over-compression of the gasket seal. For example, the height h of the inner wall portion may be selected such that the distance d between the sealing face 137 and the body seat surface 124 (which may, but need not correspond to the height h) is limited to a predetermined fraction of the gasket seal cross-sectional thickness (e.g., about 35% to about 65%, or about 40% to about 55%) to limit compression of the gasket seal by a corresponding fraction of the gasket seal cross-sectional thickness (e.g., about 65% to about 35%, or about 60% to about 45%).

The thickness t of the inner wall portion 127 may be selected to provide sufficient strength to withstand bearing engagement by the poppet 130, for example, under substantial backpressure loads, to provide a desired gasket seal inner diameter fit clearance, to provide a desired bore inner diameter to accommodate desired flow rates, and/or to provide a sufficient sealing surface for engagement with the outer peripheral sealing face 137 of the poppet head portion 131.

The outboard end of the bushing 140 may be provided with a tapered flow guide surface 144 opposite the end surface 142, disposed at an angle θ1 (e.g., about 30° to 60°, or about 40° to 45°, or about 40°, with respect to the valve central axis) to complement or substantially match (e.g., within about 5° taper angle) an angle θ2 of the conical surface 136 of the poppet head portion 131, to guide flow toward the poppet side channels 134, for example, to reduce turbulence and optimize flow performance.

In some applications, the gasket seal valve seat may expand in size or volume while the valve is in service, for example, due to chemical reactivity, or pressure or temperature changes within the valve. According to another aspect of the present disclosure, a biasing member may be provided between the bushing and the valve body housing to transmit an axially compressive force from the valve body housing to the bushing. In applications where the gasket seal expands, compressibility of the biasing member allows for axial movement of the bushing away from the body seat surface to avoid damage to the gasket seal.

In the illustrated embodiment, one or more Belleville washers 145 (or other suitable biasing member) are disposed between the inboard end 143 of the bushing 140 and the inboard end face or bearing portion 126 of the second body housing member 120-2, to allow for axial movement of the bushing 140 with respect to the body seat surface 124, for example, to accommodate changes in the size of the gasket seal 160 or other dimensional tolerances in the valve components. In the illustrated embodiment, a spring bearing 146 is provided between the biasing member 145 and the bushing 140, for example, to provide a stable seating surface for the biasing member 145. As shown, the spring bearing 146 may additionally provide a seating surface for the biasing spring 150. In other embodiments (not shown), the bushing may be provided with a bearing portion integrally formed with the inboard end of the bushing, to provide bearing surfaces for the biasing member and/or biasing spring.

Figure 6:
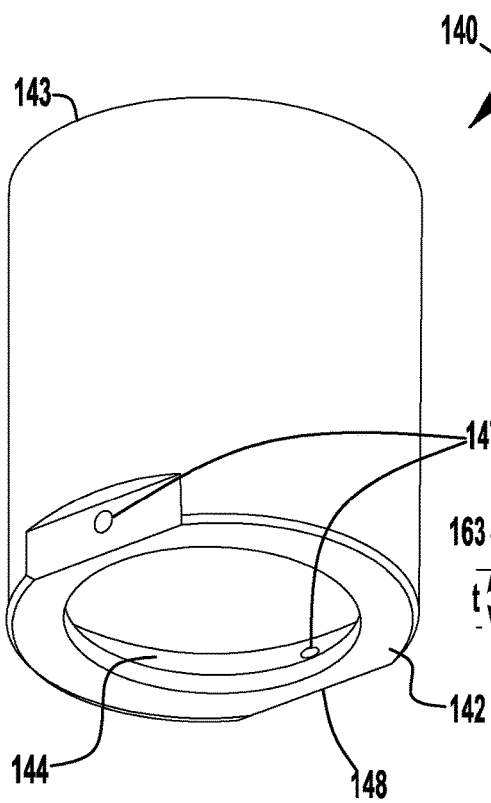
FIG. 6 is a perspective view of the bushing of the check valve of FIG. 2.
Figure 7:
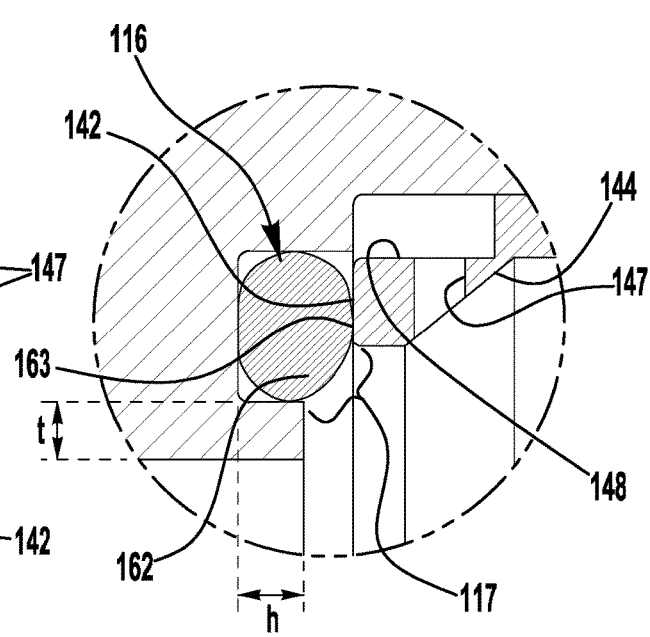
FIG. 7 is an enlarged partial cross-sectional view of valve seal and venting arrangement of the check valve of FIG. 2.
Figure 8:
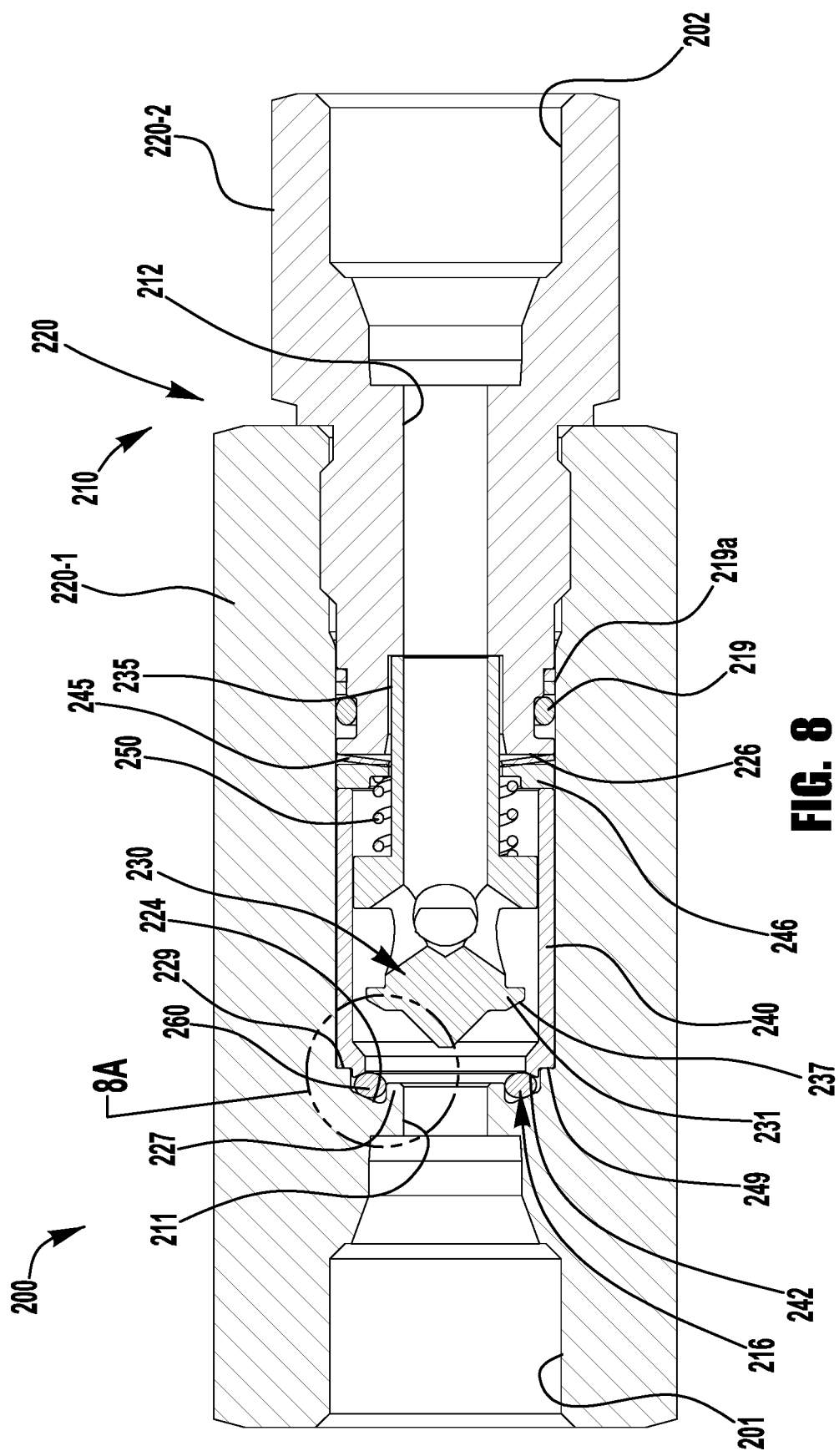
FIG. 8 is a cross-sectional view of a check valve in accordance with another exemplary embodiment of the present disclosure, shown with the poppet in the open position.
Figure 8A:
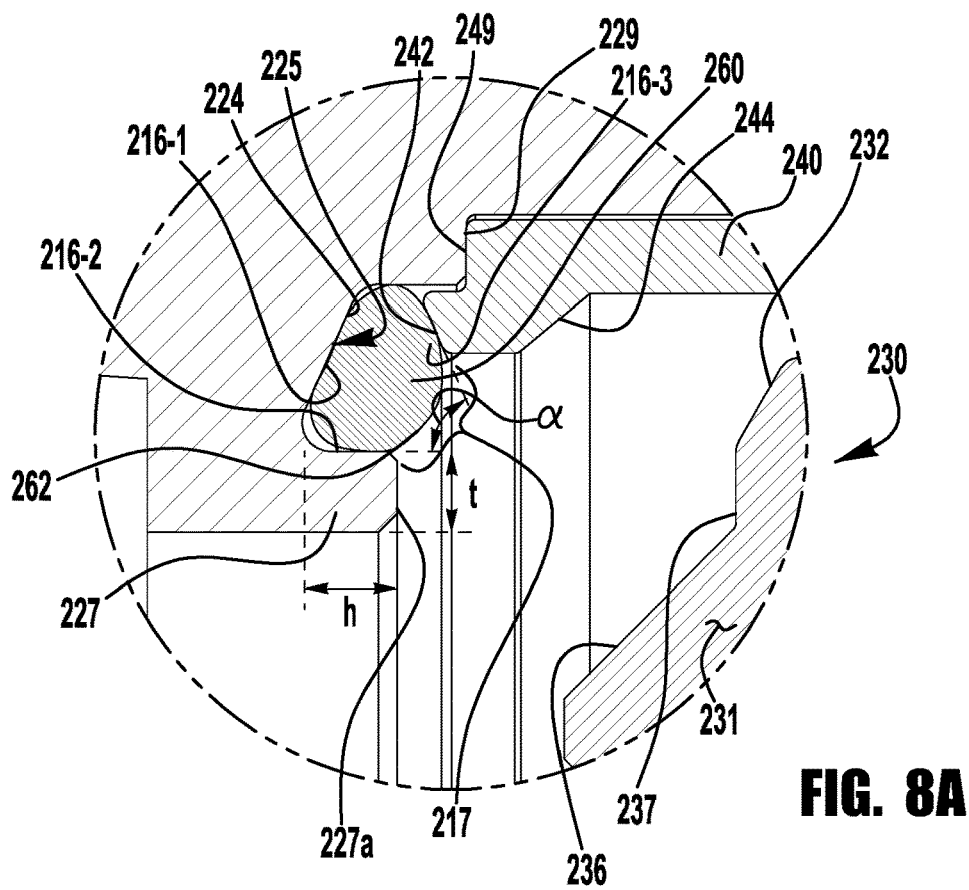
FIG. 8A is an enlarged partial cross-sectional view of the poppet and body sealing portions of the check valve of FIG. 8, shown with the poppet in the open position.
Figure 9A:
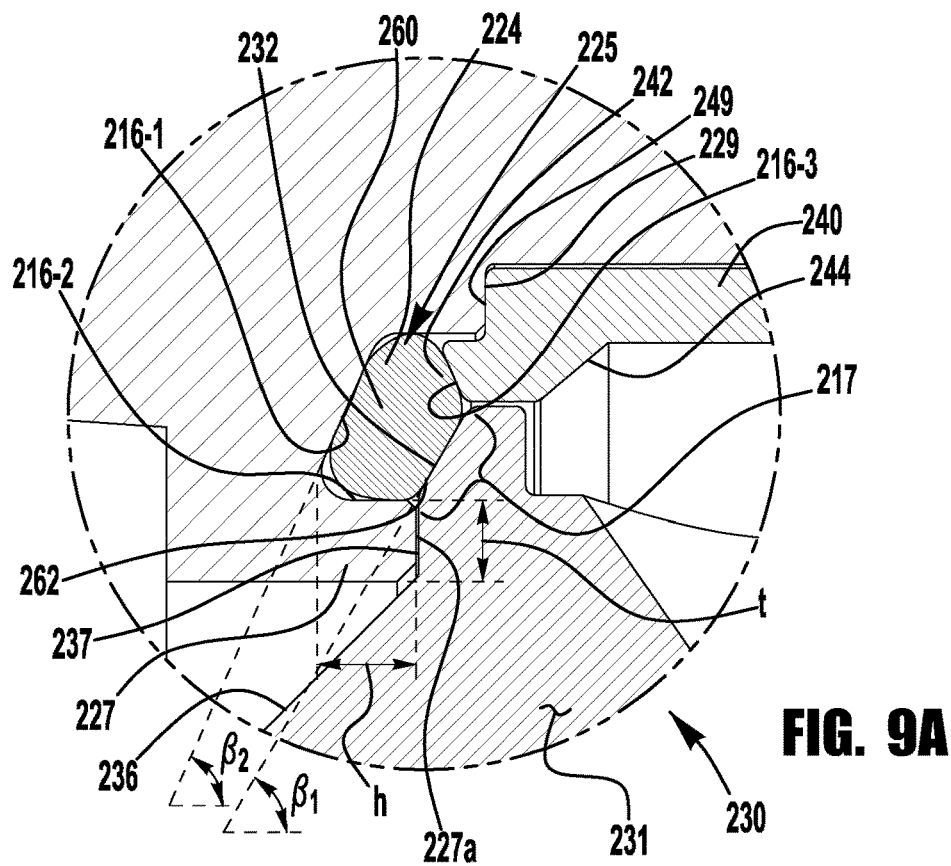
FIG. 9A is an enlarged partial cross-sectional view of the poppet and body sealing portions of the check valve of FIG. 8, shown with the poppet in the closed position.
Figure 9:
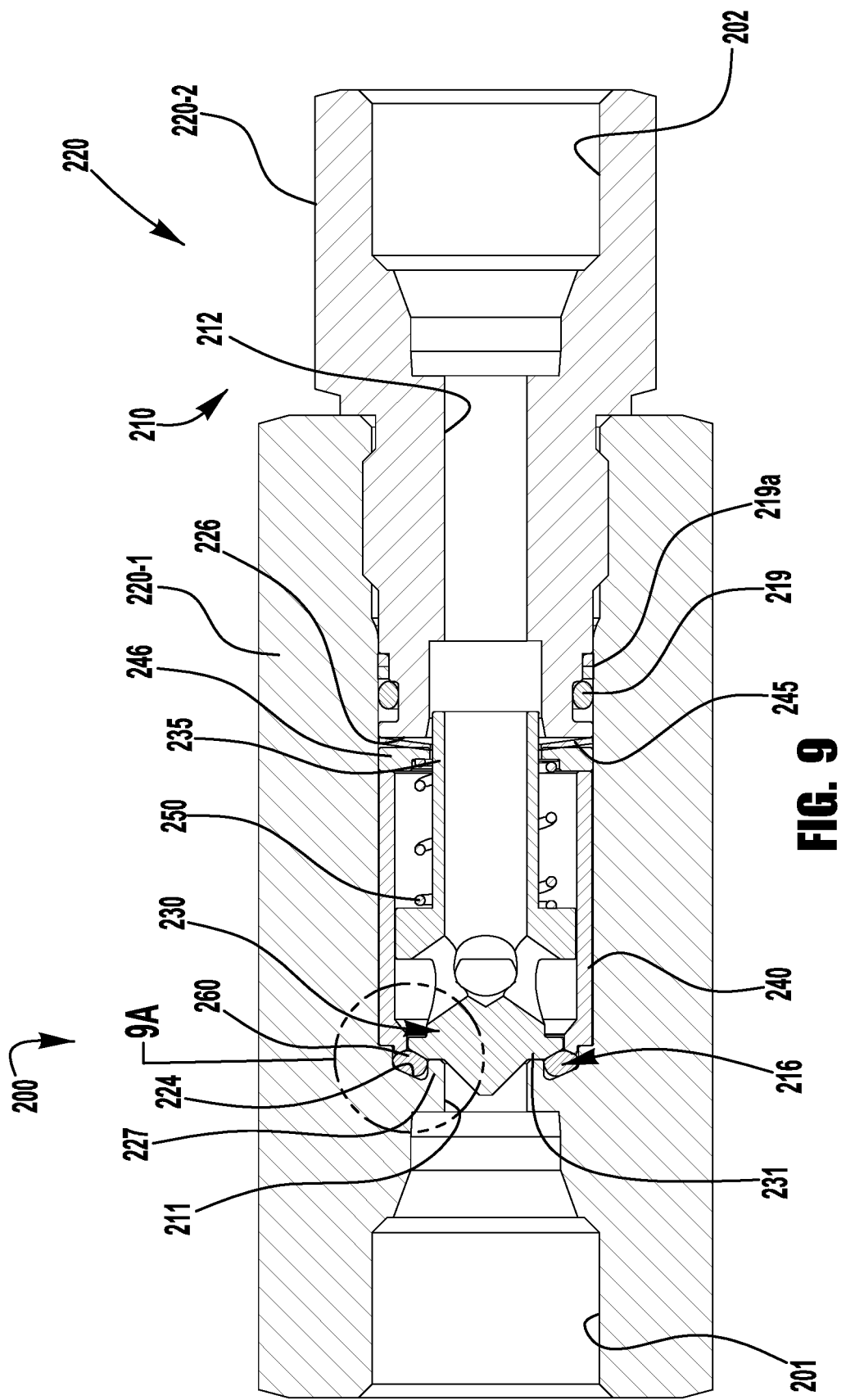
FIG. 9 is a cross-sectional side view of the check valve of FIG. 8, shown with the poppet in the closed position.

According to another aspect of the present application, the annular seal cavity 116 may be provided with one or more venting passages (e.g., intersecting an outer peripheral portion of the seal cavity) to provide seal-energizing fluid pressure against an outer peripheral surface of the valve seat gasket seal 160 when the poppet 130 is in the closed position, and to provide for venting of pressurized fluid from the seal cavity 116 when the poppet is in the open position. This venting when the valve 100 is opened may prevent the valve seat gasket seal 160 from being forced through the inner peripheral gap 117 due to a build-up of pressure in the seal cavity 116. As illustrated in FIGS. 6 and 7, the outboard end portion 142 of the bushing 140 may be provided with one or more vent passages extending from the annular seal cavity 116 to the bushing central bore 141. While many different vent passages may be provided, in the illustrated embodiment, the outboard end portion 142 includes one or more vent holes 147 extending from the bushing bore 141 to recessed (e.g., flatted) outer portions 148 of the outboard end portion 142. When the valve 100 is opened (due to sufficient positive fluid pressure applied to the poppet head portion 131, overcoming the forces of the biasing spring 150), pressure around the outer periphery of the seal cavity 116 is vented through the vent hole(s) 147 to the central bore flow path. When the valve 100 is closed (due to forces of the biasing spring 150 overcoming any upstream fluid pressure), pressurized downstream fluid passes through the vent hole(s) 147 into the outer periphery of the seal cavity 116 to pressurize or energize the valve seat gasket seal 160, thereby facilitating sealing engagement between the inner periphery 162 of the gasket seal 160 and the poppet head portion 131.

In other embodiments, according to another exemplary aspect of the present disclosure, a check valve may be provided with a body seat surface of a body housing and a bushing end surface together defining an undercut or dovetail groove shaped annular seal cavity sized and oriented to present an inner peripheral seal surface for a valve element (e.g., poppet) while retaining the gasket seal against extrusion through the inner peripheral gap in the dovetail groove.

FIGS. 8-11A illustrate another exemplary embodiment of a check valve 200, which may be similar to the check valve 100 of FIGS. 2-7 (with corresponding components numbered accordingly), having a valve body 210 including a body housing 220, a valve seat insert or gasket seal 260, and a bushing 240 having an end surface 242 that extends adjacent to a body seat surface 224 in the body housing (e.g., in first threaded body housing member 220-1, as shown) to form a dovetail groove shaped annular seal cavity 216 sized to retain the gasket seal 260 and expose an inner peripheral sealing portion 262 of the gasket seal 260 for sealing engagement with the valve element or poppet 230. As shown, the bushing end surface 242 may, but need not, be shaped to extend outboard beyond the bushing engaging shoulder portion 229 of the body housing 220.

The body seat surface 224 and bushing end surface 242 may be provided with a variety of surface contours to form a variety of different undercut or dovetail groove shaped annular seal cavities 216, with a rear seating surface 216-1 defined by a recessed surface or groove portion 225 of the body seat surface, an inner side surface 216-2 defined by an inner wall portion 227 of the body seat surface, and an outer side surface 216-3 defined by the bushing end surface 242. In the illustrated example, the rear seating surface 216-1 of the groove 225 is inwardly tapered (e.g., an angle between about 40° and about 80°, or about 66°, with respect to the valve central axis), with the dovetail groove side surfaces 216-2, 216-3 angled with respect to the seating surface (e.g., forming an included angle α of about 40° to about 80° to form a conical dovetail groove having an inner peripheral gap or neck portion 217 (e.g., having a width of about 55% to about 85% of the nominal gasket seal cross-section), for example, for exposure of the inner peripheral sealing portion 262 of the gasket seal 260.

While the side surfaces 216-2, 216-3 may be positioned to compress the gasket seal 260 against the rear seating surface 216-1 to effect a seal with the seating surface (similar to the check valve 100 of FIGS. 2-7), in some embodiments, the side surfaces 216-2, 216-3 may be effective to merely hold the gasket seal 260 in the annular seal cavity 216 when the poppet 230 is in the open position, with the poppet head portion 231 compressing the gasket seal against the rear seating surface 216-1 when in the closed position to effect a seal with the seating surface. While the sides of the seal cavity are shown as flat surfaces, in some embodiments, the seal cavity surfaces may be contoured (e.g., concave) surfaces, for example, to more closely correspond with the geometry of the gasket seal cross-section.

In the illustrated embodiment, an outer stepped portion 249 of the bushing 240 engages a shoulder portion 229 of the first body housing member 220-1 to consistently position the bushing end surface 242 (and outer side surface 216-3) with respect to the rear seating surface 216-1 and inner side surface 216-2 of the annular cavity 216. While any suitable materials may be used, in an exemplary embodiment, the bushing 240 may be provided in a material (e.g., one of stainless steel, nickel alloy, brass, bronze, and aluminum) dissimilar to (e.g., softer than) the body housing material (e.g., a different one of stainless steel, nickel alloy, brass, bronze, and aluminum), for example, to minimize wear or galling of the contacting surfaces, to limit wear to the less critical, less expensive, or more easily replaced component, or to provide specific desired material properties for one or both of the bushing and the body housing.

In the exemplary embodiment, an outer peripheral sealing edge 232 of the poppet head portion 231 engages the inner periphery 262 of the gasket seal 260. The outer peripheral sealing edge 232 may be provided with a tapered (e.g., frustoconical) surface sized to optimize contact pressure and stress within the gasket seal 260 while compressed under higher back pressure. For example, the sealing edge surface may be sized to extend along a width of about 40% to about 80% of the nominal gasket seal cross-section. In an exemplary embodiment, the angle $\beta1$ of the tapered sealing edge surface 232 may substantially match (e.g., within about 5° to within about 15°) the angle $\beta2$ of the rear seating surface 216-1, for example, for substantially uniform compression of the gasket seal 260 between the sealing edge surface and the rear seating surface when the poppet is in the closed position. In other embodiments, the tapered outer peripheral sealing edge may be replaced with a radiused sealing edge or shoulder portion, similar to the poppet 130 of FIGS. 2-7.

Similar to the check valve 100 of FIGS. 2-7, the inner wall portion 227 may provide a secondary metal-to-metal sealing surface 227a engageable with an outer peripheral sealing face 237 of the poppet head portion 231, radially inward of the gasket seal 260, for example, when the poppet 230 is exposed to a backpressure exceeding a threshold backpressure, causing the poppet to more greatly compress the gasket seal inner periphery 262 (e.g., as compared to gasket seal compression resulting from the closing forces of the biasing spring 250). In such an arrangement, the height h of the inner wall portion 227 may be selected to prevent over-compression of the gasket seal. For example, the height h of the inner wall portion may be selected such that the distance d between the sealing edge surface 232 and the opposed seating surface 216-1 is limited to a predetermined fraction of the gasket seal cross-sectional thickness (e.g., about 65% to about 95%) to limit compression of the gasket seal by a corresponding fraction of the gasket seal cross-sectional thickness (e.g., about 35% to about 5%).

The thickness t of the inner wall portion 227 may be selected to provide sufficient strength to withstand bearing engagement by the poppet 230, for example, under substantial backpressure loads, to provide a desired gasket seal inner diameter fit clearance, to provide a desired bore inner diameter to accommodate desired flow rates, and/or to provide a sufficient sealing surface for engagement with the outer peripheral sealing face 237 of the poppet head portion 231.

The outboard end of the bushing 240 may be provided with a tapered flow guide surface 244 opposite the end surface 242, angled (e.g., about 35° to 65°, or about 40° to 45°, or about 40°) with respect to the valve central axis) to complement or substantially match (e.g., within about 15° or within about 5°) the angled conical surface 236 of the poppet head portion 231, to guide flow toward the poppet side channels 234, for example, to reduce turbulence and optimize flow performance.

Similar to the check valve 100 of FIGS. 2-7, one or more Belleville washers 245 (or other suitable biasing member) may be disposed between the inboard end 243 of the bushing 240 and the inboard end face or bearing portion 226 of the second body housing member 220-2, to allow for axial movement of the bushing 240 with respect to the body seat surface 224, for example, to accommodate changes in the size of the gasket seal 260 or other dimensional tolerances in the valve components. In the illustrated embodiment, a spring bearing 246 is provided between the biasing member 245 and the bushing 240, for example, to provide a stable seating surface for the biasing member 245. As shown, the spring bearing 246 may additionally provide a seating surface for the biasing spring 250. In other embodiments (not shown), the bushing may be provided with a bearing portion integrally formed with the inboard end of the bushing, to provide bearing surfaces for the biasing member and/or biasing spring.

Similar to the check valve 100 of FIGS. 2-7, the annular seal cavity 216 may be provided with one or more venting passages (e.g., intersecting an outer peripheral portion of the seal cavity) to provide seal-energizing fluid pressure against an outer peripheral surface of the valve seat gasket seal 260 when the poppet 230 is in the closed position, and to provide for venting of pressurized fluid from the seal cavity 216 when the poppet is in the open position. This venting when the valve 200 is opened may prevent the valve seat gasket seal 260 from being forced through the inner peripheral gap or dovetail neck portion 217 due to a build-up of pressure in the seal cavity 216. As illustrated in FIGS. 10, 11, and 11A, the outboard end portion 242 of the bushing 240 may be provided with one or more vent passages extending from the annular seal cavity 216 to the bushing central bore 241. While many different vent passages may be provided, in the illustrated embodiment, the outboard end portion 242 includes one or more vent holes 247 extending from the bushing bore 241 to recessed (e.g., chamfered) outer portions 248 of the outboard end portion 242. When the valve 200 is opened (due to sufficient positive fluid pressure applied to the poppet head portion 231, overcoming the forces of the biasing spring 250), pressure around the outer periphery of the seal cavity 216 is vented through the vent hole(s) 247 to the central bore flow path. When the valve 200 is closed (due to forces of the biasing spring 250 overcoming any upstream fluid pressure), pressurized downstream fluid passes through the vent hole(s) 247 into the outer periphery of the seal cavity 216 to pressurize or energize the valve seat gasket seal 260, thereby facilitating sealing engagement between the inner periphery 262 of the gasket seal 260 and the poppet head portion 231.

Other seat seal groove configurations may be utilized. In the exemplary embodiment of FIGS. 12 and 12A, the inner wall portion 227' may be provided with a tapered outer surface 227b' to provide a desired included angle $\alpha$ (with bushing end surface 242'), for example, about 40° to about 80°, for the dovetail groove cavity 216', for example, to provide a desired retention of the gasket seal 260. While the sides of the seal cavity are shown as flat surfaces, in some embodiments, the seal cavity surfaces may be contoured (e.g., concave) surfaces, for example, to more closely correspond with the geometry of the gasket seal cross-section.

Figure 12B:
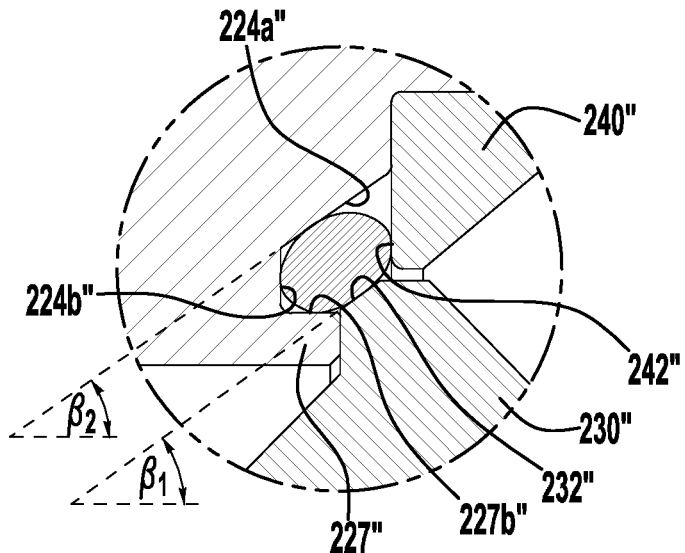
FIG. 12B is an enlarged partial cross-sectional view of poppet and body sealing portions of a check valve accordingly to another exemplary embodiment of the present disclosure, shown with the poppet in the closed position.

In the exemplary embodiment of FIG. 12B, the annular seal cavity 216" includes a tapered seat surface 224a"

opposite from and which may, but need not, be angled to substantially match (e.g., within about 15° or within about 5° an outer peripheral sealing edge 232" of the poppet head portion 231", and a radial seat surface 224b", opposite from and which may, but need not, be substantially parallel to match (e.g., within about 15° or within about 5° the radial bushing end surface 242". As shown, the inner wall portion 227" may include an axially extending outer surface 227b" that further defines the seal cavity 216", resulting in a four-sided (e.g., trapezoid shaped) seal cavity for the gasket seal 260". This configuration may, for example, be simpler to manufacture or machine than the dovetail groove configurations of FIGS. 8-11 and 12-12A. While the sides of the seal cavity are shown as flat surfaces, in some embodiments, the seal cavity surfaces may be contoured (e.g., concave) surfaces, for example, to more closely correspond with the geometry of the gasket seal cross-section.

Figure 12C:
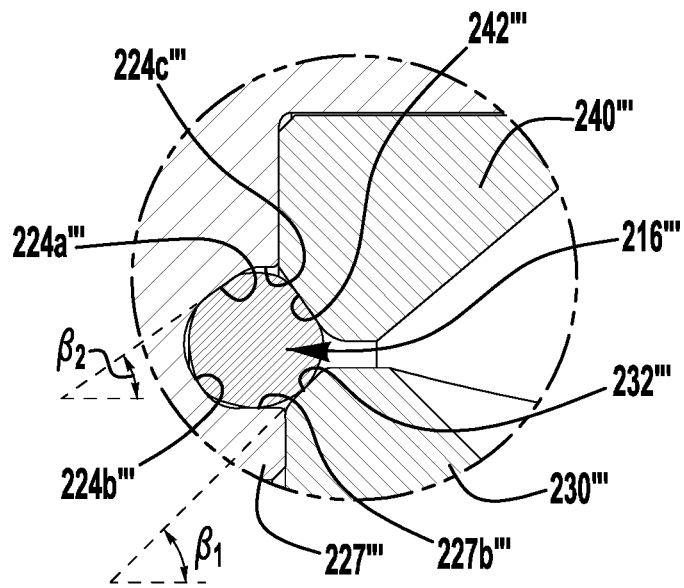
FIG. 12C is an enlarged partial cross-sectional view of poppet and body sealing portions of a check valve accordingly to another exemplary embodiment of the present disclosure, shown with the poppet in the closed position.

In the exemplary embodiment of FIG. 12C, the annular seal cavity 216''' includes a first tapered seat surface 224a''' opposite from and which may, but need not, be angled to substantially match (e.g., within about 15° or within about 5°) an outer peripheral sealing edge 232''' of the poppet head portion 231''', and a second tapered seat surface 224b''' opposite from and which may, but need not, be angled to substantially match (e.g., within about 15° or within about 5°) the tapered bushing end surface 242'. In some embodiments, the tapered surface of the sealing edge 232' may be disposed at a greater angle β1 than the angle β2 of the first tapered seat surface 224a''' (e.g., about 10° greater), for example, to reduce pinching of the gasket seal 260''' by the closing poppet. As shown, an axially extending outer surface 227b''' of the inner wall portion 227''' and an axially extending inner peripheral surface 224c' of the body seat recess 224''' may, but need not, be provided to further define the seal cavity 216', resulting in a six-sided seal cavity for the gasket seal 260'''. This configuration may, for example, be sized and shaped to more closely fit the geometry of the gasket seal 260''', resulting in balanced strains and stresses on the captured gasket seal while under poppet load and/or fluid pressure. This design may utilize a lower initial squeeze of the gasket seal by the poppet head sealing edge 232''' while utilizing pressure load to and deformation of the gasket seal 260' to still produce a seal at high backpressure, similar to the other embodiments disclosed herein. The first and second tapered seat surfaces 224a''', 224b''' may be joined by a fully radiused surface or by one or more transitioning flat surfaces. While the sides of the seal cavity are shown as flat surfaces, in some embodiments, the seal cavity surfaces may be contoured (e.g., concave) surfaces, for example, to more closely correspond with the geometry of the gasket seal cross-section.

In the embodiments of FIGS. 2-12A, the check valve body housing is formed from a female threaded enclosure defining the inlet port, body seat surface, and outer circumferential wall defining the valve cavity, and a male threaded end screw defining the outlet port and the poppet counterbore, with an end portion of the end screw defining the biasing member bearing portion. In other embodiments, a check valve may be provided with a body housing formed from a male threaded end screw defining the inlet port, with an end portion of the end screw defining a body seat surface, and a female threaded enclosure defining the outlet port, the outer circumferential wall, and the poppet counterbore. Such an arrangement may facilitate machining of the body seat surface, for example, by providing the body seat surface on an endmost surface of a male threaded end screw, rather than in a recessed cavity within a tubular body housing member.

FIGS. 13 and 13A illustrate an exemplary embodiment of a check valve 300, which may be similar to the check valves 100, 200 of FIGS. 2-7 and 8-12A (with corresponding components numbered accordingly), and including any one or more of the features described above, having a valve body 310 including a body housing 320, a valve seat insert or gasket seal 360, and a bushing 340 having an end surface 342 that extends adjacent to a body seat surface 324 on the body housing (e.g., in first threaded body housing member 320-1, as shown) to form an annular seal cavity 316 sized to retain the gasket seal 360 and expose an inner peripheral sealing portion 362 of the gasket seal 360 for sealing engagement with the valve element or poppet 330.

The exemplary body housing 320 including first and second body housing members 320-1, 320-2 assembled (e.g., threaded assembly) to define the interior valve cavity 315, with the inlet port 311 disposed on the first body housing member 320-1 and the outlet port 312 disposed on the second body housing member 320-2. The body seat surface 324 is disposed on (e.g., integrally formed with) the first body housing member 320-1. The first body housing member 320-1 includes an end screw structure having a male threaded inboard end 323 defining the body seat surface 324. The second body housing member 320-2 includes a substantially tubular enclosure structure defining the outer circumferential wall 313 and the interior valve cavity 315, with a female threaded portion 328 that is threadably assembled with the male threaded inboard end 323 of the first body housing member 320-1. A body seal gasket 319 (e.g., with one or more backup rings 319a, as shown) may be provided in an annular groove in the first body housing member inboard end 323, for example, to provide a body seal between the valve cavity 315 and the threaded engagement of the body housing members 320-1, 320-2, thereby eliminating wetted threads. In other embodiments, the check valve may include a body seal gasket (e.g., a metal gasket) that is axially compressed between a counterbore surface of the outlet enclosure housing member and a shoulder surface of the inlet end screw housing member, similar to the embodiment of FIG. 14 described herein.

The body seat surface 324 and bushing end surface 342 may be provided with a variety of surface features to form a variety of different annular seal cavities 316. In the illustrated example, the body seat surface 324 includes a recessed surface defined by a flat, radially extending outer end face 324a, and an annular inner wall portion 327 extending axially inboard of the recessed surface, and the bushing end surface 342 includes a flat, radially extending inner end face 342a, and an annular outer wall portion 342b extending axially into engagement with the recessed surface of the body seat surface. In other embodiments, the end faces and annular wall portions may be contoured to provide differently shaped annular cavities (e.g., the dovetail groove cavities described herein).

The outboard end of the bushing 340 may be provided with a tapered flow guide surface 344 opposite the end surface 342, angled (e.g., about 35° to 65°, or about 40° to 45°, or about 40°, with respect to the valve central axis) to complement or substantially match (e.g., within about 15°, or within about 5°) the angled conical surface 336 of the poppet head portion 331, to guide flow toward the poppet side channels 334, for example, to reduce turbulence and optimize flow performance.

Similar to the check valve 100 of FIGS. 2-7, one or more Belleville washers 345 (or other suitable biasing member) may be disposed between the inboard end 343 of the bushing 340 and the inboard end face or bearing portion 326 of the second body housing member 320-2, to allow for axial movement of the bushing 340 with respect to the body seat surface 324, for example, to accommodate changes in the size of the gasket seal 360 or other dimensional tolerances in the valve components. In the illustrated embodiment, a spring bearing 346 is provided between the biasing member 345 and the bushing 340, for example, to provide a stable seating surface for the biasing member 345. As shown, the spring bearing 346 may additionally provide a seating surface for the biasing spring 350. In other embodiments (not shown), the bushing may be provided with a bearing portion integrally formed with the inboard end of the bushing, to provide bearing surfaces for the biasing member and/or biasing spring.

While any suitable materials may be used, in an exemplary embodiment, the bushing 340 may be provided in a material (e.g., one of stainless steel, nickel alloy, brass, bronze, and aluminum) dissimilar to (e.g., softer than) the body housing material (e.g., a different one of stainless steel, nickel alloy, brass, bronze, and aluminum), for example, to minimize wear or galling of the contacting surfaces, to limit wear to the less critical, less expensive, or more easily replaced component, or to provide specific desired material properties for one or both of the bushing and the body housing.

Figure 13B:
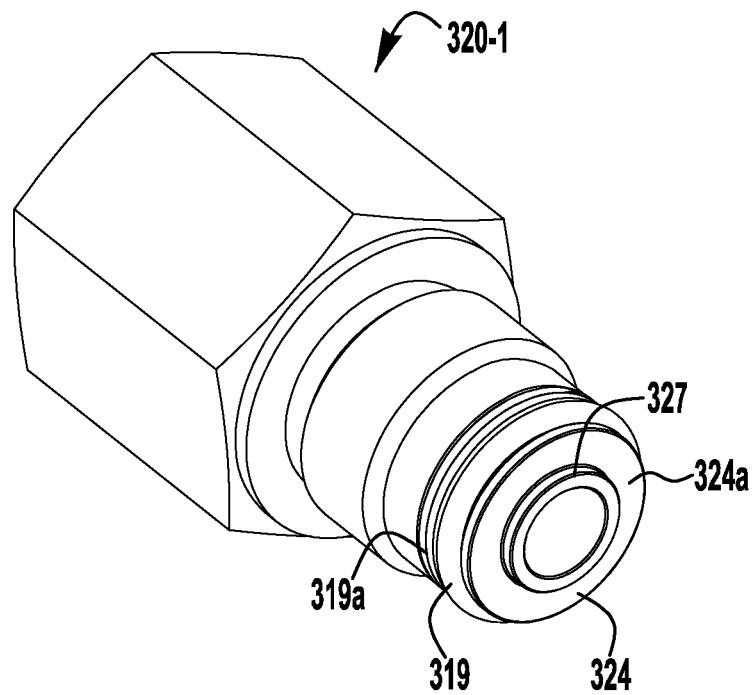
FIG. 13B is a perspective view of the inlet end screw of the check valve of FIG. 13.
Figure 13C:
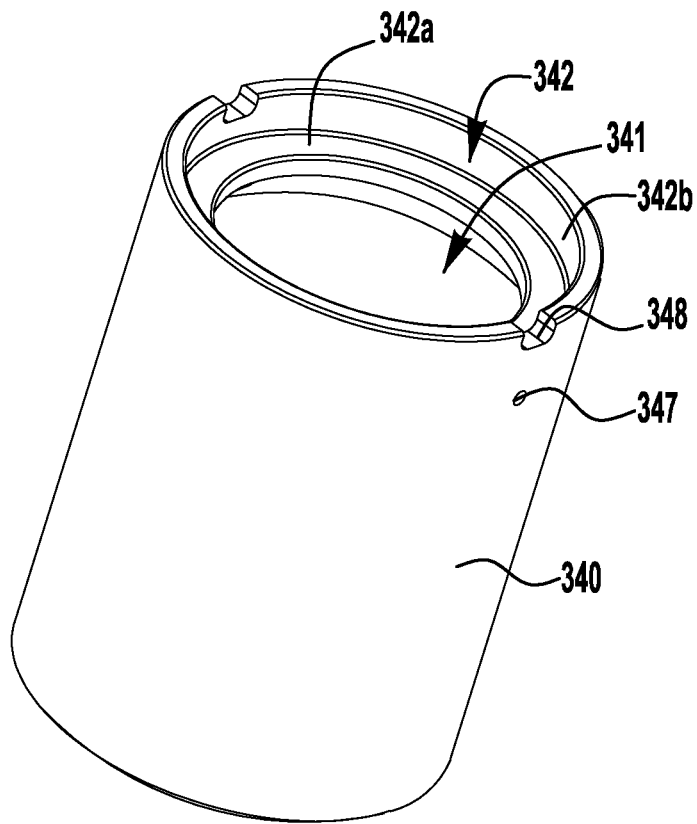
FIG. 13C is a perspective view of the bushing of the check valve of FIG. 13.

Similar to the check valves 100, 200, 200' of FIGS. 2-12A, the annular seal cavity 316 may be provided with one or more venting passages (e.g., intersecting an outer peripheral portion of the seal cavity) to provide seal-energizing fluid pressure against an outer peripheral surface of the valve seat gasket seal 360 when the poppet 330 is in the closed position, and to provide for venting of pressurized fluid from the seal cavity 316 when the poppet is in the open position. This venting when the valve 300 is opened may prevent the valve seat gasket seal 360 from being forced through the inner peripheral gap due to a build-up of pressure in the seal cavity 316. As illustrated in FIG. 13B, the outboard end portion 342 of the bushing 340 may be provided with one or more vent passages extending from the annular seal cavity 316 to the bushing central bore 341. While many different vent passages may be provided, in the illustrated embodiment, the outboard end portion 342 includes one or more vent holes 347 and notched end portions 348 of the outboard end portion 342. When the valve 300 is opened (due to sufficient positive fluid pressure applied to the poppet head portion 331, overcoming the forces of the biasing spring 350), pressure around the outer periphery of the seal cavity 316 is vented through the vent hole(s) 347 to the central bore flow path. When the valve 300 is closed (due to forces of the biasing spring 350 overcoming any upstream fluid pressure), pressurized downstream fluid passes through the vent hole (s) 347 into the outer periphery of the seal cavity 316 to pressurize or energize the valve seat gasket seal 360, thereby facilitating sealing engagement between the inner periphery of the gasket seal and the poppet head portion 331.

In the embodiments of FIGS. 2-13A, the valve seat insert 160, 260, 260', 360 is an elastomeric gasket seal seated in an annular groove or seal cavity 116, 216, 216', 316 in the body housing 120, 220, 220', 320. In other embodiments, the valve seat insert may be provided as a plastic gland or ring installed in the body housing. In some applications, a plastic valve seat material may be selected based on chemical compatibility, temperature ratings, wear resistance, or other such factors. Exemplary plastic materials include, but are not limited to, polytetrafluoroethylene (PTFE), polyetheretherketone (PEEK), and ultra-high-molecular-weight polyethylene (UHMWPE).

FIGS. 14 and 14A illustrate an exemplary embodiment of a check valve 400, which may be similar to the check valves of FIGS. 2-13A (with corresponding components numbered accordingly), and including any one or more of the features described above, having a valve body 410 including a body housing 420 formed from an inlet enclosure 420-1 and outlet end screw 420-2 (e.g., similar to the body housing members 120-1, 120-2 of the check valve of FIGS. 2-7), a valve seat insert (e.g., plastic gland) 460, and a bushing 440 having an end surface 442 that extends adjacent to a body seat surface 424 on the body housing (e.g., in the inlet enclosure 420-1, as shown) to form an annular seal cavity 416 sized to retain the valve seat insert 460 and expose an inner peripheral sealing portion 462 of the seat insert 460 for sealing engagement with the valve element or poppet 430.

To effect a consistent seal between the poppet head portion 431 and the seat insert 460 and between the seat insert and the body seat surface 424 in the closed position, an axial compressive force may be applied to the seat insert. In the illustrated embodiment, the tubular bushing 440 installed in the valve cavity 415 is sized and positioned to apply a compressive force against the seat insert 460. The bushing 440 includes a central bore 441 in which the poppet 430 is closely received and guided between closed and open positions. An inboard end 443 of the bushing 440 is indirectly engaged by the valve body housing 420 (e.g., by an inboard end face or bearing portion 426 of the second body housing member 420-2), forcing an outboard end surface 442 of the bushing 440 into compressing and sealing engagement with a medial portion 463 of the valve seat insert 460. In the illustrated embodiment, the outboard end surface 442 of the bushing 440 engages a shoulder portion 429 of the first body housing member 420-1 to limit compression of the valve seat insert 460 (e.g., to prevent damage to the seat insert). The outboard end surface 442 of the bushing 440 may be contoured (e.g., tapered axially outward and radially inward) to provide a desired amount of compression of the seat insert 460 when the bushing abuts the shoulder portion 429.

While any suitable materials may be used, in an exemplary embodiment, the bushing 440 may be provided in a material (e.g., one of stainless steel, nickel alloy, brass, bronze, aluminum, and PEEK) dissimilar to the body housing material (e.g., a different one of stainless steel, nickel alloy, brass, bronze, aluminum, and PEEK), for example, to minimize wear or galling of the contacting surfaces, or to provide specific desired material properties for one or both of the bushing and the body housing. In other embodiments, the same material may be used for both the bushing and the body housing.

The valve seat insert 460 may be radially protected or aligned with the body seat surface 424 by an annular inner wall portion 427 extending axially inboard from the recessed body seat surface, toward the bushing 440. When pressurized fluid is applied to the inlet port 411, the inner wall portion 427 shields the flow away from direct contact with the gasket seal inner periphery 462, for example, to protect the seat insert 427 from abrasive high velocity flow. The recessed surface 424, inner wall portion 427 and bushing end surface 442 together define an annular seal cavity 416 retaining the valve seat gasket seal 160 (e.g., in an inner peripheral portion of the seal cavity). The seal cavity 416 includes an inner peripheral gap 417 defined by the inner wall portion 427 and bushing end surface 442, which exposes the inner peripheral sealing portion 462 of the valve seat insert 460, radially aligned with the outer peripheral sealing edge 432 of the poppet head portion 431 to provide a fluid tight seal when the poppet 430 is in the closed position.

While the seat insert 460 may be loosely fit or press fit with the body seat surface 424, in some embodiments, the inner wall portion 427 may be staked or crimped radially outward to secure the seat insert with the inlet enclosure 420-1 prior to assembly of the check valve body 420.

In some applications, the inner wall portion 427 may provide a secondary metal-to-metal sealing surface engageable with an outer peripheral sealing face of the poppet head portion, as described in greater detail above with respect to the embodiments of FIGS. 2-13C.

The outboard end of the bushing 440 may be provided with a tapered flow guide surface 444 opposite the end surface 442, angled (e.g., about 30° to 60°, or about 40° to 45°, or about 40°, with respect to the valve central axis) to complement or substantially match (e.g., within about 15°, or within about 5°) the angled conical surface 436 of the poppet head portion 431, to guide flow toward the poppet side channels 434, for example, to reduce turbulence and optimize flow performance.

In some applications, the valve seat insert may expand in size or volume while the valve is in service, for example, due to chemical reactivity, or pressure or temperature changes within the valve. According to another aspect of the present disclosure, a biasing member may be provided between the bushing and the valve body housing to transmit an axially compressive force from the valve body housing to the bushing. In applications where the gasket seal expands, compressibility of the biasing member allows for axial movement of the bushing away from the body seat surface to avoid damage to the gasket seal.

In the illustrated embodiment, one or more Belleville washers 445 (or other suitable biasing member) are disposed between the inboard end 443 of the bushing 440 and the inboard end face or bearing portion 426 of the second body housing member 420-2, to allow for axial movement of the bushing 440 with respect to the body seat surface 424, for example, to accommodate changes in the size of the gasket seal 460 or other dimensional tolerances in the valve components. In the illustrated embodiment, a spring bearing 446 is provided between the biasing member 445 and the bushing 440, for example, to provide a stable seating surface for the biasing member 445. As shown, the spring bearing 446 may additionally provide a seating surface for the biasing spring 450. In other embodiments (not shown), the bushing may be provided with a bearing portion integrally formed with the inboard end of the bushing, to provide bearing surfaces for the biasing member and/or biasing spring.

According to another aspect of the present application, the annular seal cavity 416 may be provided with one or more venting passages (e.g., intersecting an outer peripheral portion of the seal cavity) to provide seal-energizing fluid pressure against an outer peripheral surface of the valve seat insert 460 when the poppet 430 is in the closed position, and to provide for venting of pressurized fluid from the seal cavity 416 when the poppet is in the open position. This venting when the valve 400 is opened may prevent the valve seat insert 460 from being forced through the inner peripheral gap 417 due to a build-up of pressure in the seal cavity 416. While many different vent passages may be provided, in the illustrated embodiment, the outboard end portion 442 includes one or more vent holes 447 extending from the bushing bore 441 to recessed (e.g., flatted) outer portions 448 of the outboard end portion 442. When the valve 400 is opened (due to sufficient positive fluid pressure applied to the poppet head portion 431, overcoming the forces of the biasing spring 450), pressure around the outer periphery of the seal cavity 416 is vented through the vent hole(s) 447 to the central bore flow path. When the valve 400 is closed (due to forces of the biasing spring 450 overcoming any upstream fluid pressure), pressurized downstream fluid passes through the vent hole(s) 447 into the outer periphery of the seal cavity 416 to pressurize or energize the valve seat insert 460, thereby facilitating sealing engagement between the inner periphery 462 of the valve seat insert and the poppet head portion 431.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. A check valve comprising:
    a valve body including:
        a body housing including an outer circumferential wall extending between an inlet port and an outlet port to define a valve cavity therebetween;
        a stationary annular valve seat insert seated in a body seat surface surrounding the inlet port;
        a bushing disposed in the valve cavity and defining a central bore, the bushing including an outboard end surface in axial engagement with the valve seat insert; and
        a biasing member disposed between a bearing portion of the body housing and an inboard end of the bushing to allow for axial movement of the bushing with respect to the body seat surface; and
    a valve element extending through the bushing central bore and movable between a closed position in which the valve element seals against the valve seat insert to prevent flow between the inlet port and the outlet port, and an open position in which fluid flow is permitted from the inlet port to the outlet port.

2. The check valve of claim 1, wherein the biasing member includes at least one Belleville washer.

3. The check valve of claim 1, further comprising a bearing member disposed between the biasing member and the inboard end of the bushing.

4. The check valve of claim 3, further comprising a biasing spring disposed between the valve element and the bearing member to bias the valve element toward the closed position.

5. The check valve of claim 4, wherein the biasing spring is radially disposed between the valve element and the bushing.

6. The check valve of claim 1, wherein the body housing comprises a first body housing member threadably assembled with a second body housing member.

7. The check valve of claim 6, wherein the first body housing member includes the inlet port, the body seat, and the outer circumferential wall, and the second body housing member includes the body housing bearing portion and the outlet port.

8. The check valve of claim 6, wherein the second body housing member comprises a male threaded end screw, the body housing bearing portion being disposed on an end face of the end screw.

9. The check valve of claim 6, wherein the first body housing member includes the inlet port and the body seat, and the second body housing member includes the outer circumferential wall, the body housing bearing portion, and the outlet port.

10. The check valve of claim 9, wherein the first body housing member comprises a male threaded end screw, the body seat being disposed on an end face of the end screw.

11. The check valve of claim 6, further comprising a body seal gasket installed between opposed surfaces of the first and second body housing members to provide a seal between the valve cavity and mating threads of the first and second body housing members.

12. The check valve of claim 6, wherein the valve element comprises a poppet having an outboard head portion and an inboard tail portion.

13. The check valve of claim 12, wherein the tail portion of the poppet is received in a counterbore of the outlet port.

14. The check valve of claim 12, wherein the bushing further comprises a tapered flow guide surface opposite the outboard end surface and angled to substantially match an angled conical surface of the poppet head portion, to guide flow toward an internal flow passage of the poppet when the valve element is in the open position.

15. The check valve of claim 1, wherein the body seat surface and the bushing outboard end surface together define an annular seal cavity sized to retain the valve seat insert.

16. The check valve of claim 15, wherein the bushing further comprises at least one outer peripheral recess extending to the outboard end surface to intersect the annular seal cavity, with the at least one outer peripheral recess including a vent passage intersecting the bushing central bore.

17. The check valve of claim 15, wherein the annular seal cavity comprises a dovetail groove having a rear seating surface and first side surface defined by the body seat surface and a second side surface defined by the bushing outboard end surface.

18. The check valve of claim 17, wherein the dovetail groove comprises a conical dovetail groove, with a rear seating surface extending at an angle of about 40° to about 80° with respect to a central axis of the valve.

19. The check valve of claim 17, wherein the first and second side surfaces of the dovetail groove form an included angle of about 40° to about 80°.

20. The check valve of claim 15, wherein the annular seal cavity is partially defined by a tapered portion of the body seat surface opposite a tapered outer peripheral sealing surface of the valve element, and a radial portion of the body seat surface opposite the bushing outboard end surface.

21. The check valve of claim 20, wherein the tapered portion of the body seat surface extends substantially parallel to the tapered outer peripheral sealing surface of the valve element.

22. The check valve of claim 20, wherein the annular seal cavity is further defined by an axially extending outer surface of an inner wall portion.

23. The check valve of claim 15, wherein the annular seal cavity is partially defined by a first tapered portion of the body seat surface opposite a tapered outer peripheral sealing surface of the valve element, and a second tapered portion of the body seat surface opposite from the bushing outboard end surface.

24. The check valve of claim 23, wherein the first tapered portion of the body seat surface extends substantially parallel to the tapered outer peripheral sealing surface of the valve element.

25. The check valve of claim 23, wherein the second tapered portion of the body seat surface extends substantially parallel to the bushing outboard end surface.

26. The check valve of claim 23, wherein the annular seal cavity is further defined by an axially extending outer surface of an inner wall portion and an axially extending inner peripheral portion of the body seat.

27. The check valve of claim 1, wherein the valve seat insert comprises an elastomeric gasket seal.

28. The check valve of claim 1, wherein the valve seat insert comprises a plastic gland.

29. The check valve of claim 28, wherein the body seat surface comprises a recessed surface sized to retain the plastic gland and an annular inner wall portion extending axially inboard from the recessed surface.

30. The check valve of claim 29, wherein the annular inner wall portion is staked radially outward for retention of the plastic gland in the recessed surface.

31. A check valve comprising:
a valve body including:
a body housing including an outer circumferential wall extending between an inlet port and an outlet port to define a valve cavity therebetween;
a stationary annular valve seat insert seated in a body seat surface surrounding the inlet port;
a bushing disposed in the valve cavity and defining a central bore, the bushing including an outboard end surface in axial engagement with the valve seat insert;
a biasing member disposed between a bearing portion of the body housing and an inboard end of the bushing to allow for axial movement of the bushing with respect to the body seat surface; and
a valve element extending through the bushing central bore and movable between a closed position in which the valve element seals against the valve seat insert to prevent flow between the inlet port and the outlet port, and an open position in which fluid flow is permitted from the inlet port to the outlet port;
wherein the body seat surface comprises a recessed surface sized to retain the valve seat insert and an annular inner wall portion extending axially inboard from the recessed surface, the annular inner wall portion being sized to abut the valve element when the valve element is exposed to a backpressure exceeding a threshold backpressure, to limit compression of the valve seat insert by the valve element to a predetermined fraction of an uncompressed thickness of the valve seat insert.

32. The check valve of claim 31, wherein the valve seat insert comprises an elastomeric gasket seal.

33. The check valve of claim 31, wherein the annular inner wall portion defines a secondary seal surface positioned to sealingly engage an outer peripheral sealing face of the valve element, radially inward of the valve seat insert, when the valve element is exposed to a backpressure exceeding a threshold backpressure.

34. A check valve comprising:
a valve body including:
a body housing having a first body housing member including an inlet port, a body seat surface surrounding the inlet port, and an outer circumferential wall extending to a female threaded end portion, and a second body housing member including an outlet port and a male threaded end screw assembled with the female threaded end portion;
a stationary annular valve seat insert seated in a body seat surface surrounding the inlet port;

a bushing disposed in the valve cavity and defining a central bore, the bushing including an outboard end surface axially engageable with the valve seat insert; and a biasing member disposed between a bearing portion of the male threaded end screw and an inboard end of the bushing to transmit an axial compressive force from the second body housing member to the valve seat insert; and a valve element extending through the bushing central bore and movable between a closed position in which the valve element seals against the valve seat insert to prevent flow between the inlet port and the outlet port, and an open position in which fluid flow is permitted from the inlet port to the outlet port.

35. The check valve of claim 34, wherein the valve element comprises a poppet having an outboard head portion, an inboard tail portion, and an internal flow passage extending from the head portion to the tail portion.

36. The check valve of claim 35, wherein the tail portion of the poppet is received in a counterbore of the outlet port.

* * * * *